US007333993B2

(12) United States Patent
Fair

(10) Patent No.: US 7,333,993 B2
(45) Date of Patent: Feb. 19, 2008

(54) ADAPTIVE FILE READAHEAD TECHNIQUE FOR MULTIPLE READ STREAMS

(75) Inventor: Robert L. Fair, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 614 days.

(21) Appl. No.: 10/721,596

(22) Filed: Nov. 25, 2003

(65) Prior Publication Data

US 2005/0114289 A1   May 26, 2005

(51) Int. Cl.
G06F 7/00 (2006.01)
G06F 17/00 (2006.01)
(52) U.S. Cl. .................................. 707/100; 707/104.1
(58) Field of Classification Search ............. 707/1–10, 707/100–104.1, 200–205; 709/200–250
See application file for complete search history.

(56) References Cited

U.S. PATENT DOCUMENTS

| | | | |
|---|---|---|---|
| 5,371,870 A | 12/1994 | Goodwiin et al. | |
| 5,819,292 A | 10/1998 | Hitz et al. | |
| 5,963,962 A | 10/1999 | Hitz et al. | |
| 5,987,477 A * | 11/1999 | Schmuck et al. | 707/201 |
| 6,038,570 A | 3/2000 | Hitz et al. | |
| 6,216,208 B1 | 4/2001 | Greiner et al. | |
| 6,260,115 B1 | 7/2001 | Permut et al. | |
| 6,484,239 B1 | 11/2002 | Hill et al. | |
| 6,523,093 B1 | 2/2003 | Bogin et al. | |
| 6,567,894 B1 | 5/2003 | Hsu et al. | |
| 2002/0049841 A1* | 4/2002 | Johnson et al. | 709/225 |
| 2002/0133491 A1* | 9/2002 | Sim et al. | 707/10 |
| 2004/0255048 A1* | 12/2004 | Lev Ran et al. | 709/249 |

OTHER PUBLICATIONS

DAFS Collaborative, DAFS: Direct Access File System Protocol, Version 1.00, Revision Date Sep. 1, 2001, pp. 1-358.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
International Search Report for PCT/US2004/039591, Internation Searching Authority, Aug. 5, 2005.

* cited by examiner

*Primary Examiner*—Mohammad Ali
*Assistant Examiner*—Navneet K Ahluwalia
(74) *Attorney, Agent, or Firm*—Cesari and McKenna LLP

(57) ABSTRACT

A storage system implements a storage operating system configured to concurrently perform speculative readahead for a plurality of different read streams. Unlike previous implementations, the operating system manages a separate set of readahead metadata for each of the plurality of read streams. Consequently, the operating system can "match" a received client read request with a corresponding read stream, then perform readahead operations for the request in accordance with the read stream's associated set of metadata. Because received client read requests are matched to their corresponding read streams on a request-by-request basis, the operating system can concurrently perform readahead operations for multiple read streams, regardless of whether the read streams' file read requests are received by the storage system in sequential, nearly-sequential or random orders. Further, the operating system can concurrently perform speculative readahead for the plurality of different read streams, even when the read streams employ different readahead algorithms. The invention may be implemented by file-based or block-based storage systems, or combinations thereof.

34 Claims, 14 Drawing Sheets

500

| FILE SIZE | NUMBER OF READSETS |
|---|---|
| < 64 kB | 0 |
| 64 kB–512 kB | 1 |
| 512 kB–50 MB | 2 |
| 50 MB–1 GB | 5 |
| 1 GB–10 GB | 10 |
| > 10 GB | 15 |

ADAPTIVE FILE READAHEAD TECHNIQUE FOR MULTIPLE READ STREAMS

FIELD OF THE INVENTION

The present invention relates to storage systems and, more specifically, to a technique for a storage system to concurrently perform readahead operations for multiple read streams.

BACKGROUND OF THE INVENTION

A storage system is a computer that provides storage service relating to the organization of information on storage devices, such as disks. The storage system includes a storage operating system that logically organizes the information as a set of data blocks stored on the disks. In a block-based deployment, such as a conventional storage area network (SAN), the data blocks may be directly addressed in the storage system. However, in a file-based deployment, such as a network attached storage (NAS) environment, the operating system implements a file system to logically organize the data blocks as a hierarchical structure of addressable files and directories on the disks. In this context, a directory may be implemented as a specially formatted file that stores information about other files and directories.

The storage system may be configured to operate according to a client/server model of information delivery to thereby allow many client systems (clients) to access shared resources, such as files, stored on the storage system. The storage system is typically deployed over a computer network comprising a geographically distributed collection of interconnected communication links, such as Ethernet links, that allow clients to remotely access the shared information (e.g., files) on the storage system. The clients typically communicate with the storage system by exchanging discrete frames or packets of data formatted according to predefined network communication protocols, such as the Transmission Control Protocol/internet Protocol (TCP/IP). In this context, a protocol consists of a set of rules defining how the interconnected computer systems interact with one another.

In a file-based deployment, clients employ a semantic level of access to files and file systems stored on the storage system. For instance, a client may request to retrieve ("read") or store ("write") information in a particular file stored on the storage system. Clients typically request the services of the file-based storage system by issuing file-system protocol messages (in the form of packets) formatted according to conventional file-based access protocols, such as the Common Internet File System (CIFS), the Network File System (NFS) and the Direct Access File System (DAFS) protocols. The client requests identify one or more files to be accessed without regard to specific locations, e.g., data blocks, in which the requested data are stored on disk. The storage system converts the received client requests from file-system semantics to corresponding ranges of data blocks on the storage disks. In the case of a client "read" request, data blocks containing the client's requested data are retrieved and the requested data is then returned to the client.

In a block-based deployment, client requests can directly address specific data blocks in the storage system. Some block-based storage systems organize their data blocks in the form of databases, while other block-based systems may store their blocks internally in a file-oriented structure. Where the data is organized as files, a client requesting information maintains its own file mappings and manages file semantics, while its requests (and corresponding responses) to the storage system address the requested information in terms of block addresses on disk. In this manner, the storage bus in the block-based storage system may be viewed as being extended to the remote client systems. This "extended bus" is typically embodied as Fibre Channel (FC) or Ethernet media adapted to operate with block-based access protocols, such as the Small Computer Systems Interface (SCSI) protocol encapsulated over FC (FCP) or encapsulated over TCP/IP/Ethernet (iSCSI).

Each storage device in the block-based system is typically assigned a unique logical unit number (lun) by which it can be addressed, e.g., by remote clients. Thus, an "initiator" client system may request a data transfer for a particular range of data blocks stored on a "target" lun. Illustratively, the client request may specify a starting data block in the target storage device and a number of successive blocks in which data may be stored or retrieved in accordance with the client request. For instance, in the case of a client "read" request, the requested range of data blocks is retrieved and then returned to the requesting client.

In general, a file system does not directly access "on-disk" data blocks, e.g., assigned respective disk block numbers (dbn) in a dbn address space. Instead, there is typically a one-to-one mapping between data blocks stored on disk, e.g., in a dbn address space, and the same data blocks organized by the file system, e.g., in a volume block number (vbn) space. For instance, N on-disk data blocks may be managed within the file system by assigning each data block to a unique vbn between zero and N−1. Furthermore, the file system may associate a set of data blocks (i.e., vbns) with a file or directory managed by the file system. In this case, the file system may attribute each data block in the file or directory with a corresponding "file offset" or file block number (fbn). Illustratively, the file offsets in the file or directory may be measured in units of fixed-sized data blocks, e.g., 4 kilobyte (kB) blocks, and therefore can be mapped one-to-one to fbn numbers in that file or directory. Accordingly, each file or directory is defined within the file system as a sequence of data blocks assigned to consecutively numbered fbns, e.g., where the first data block in each file or directory is assigned to a predetermined starting fbn number, such as zero. Here, it is noted that the file system assigns sequences of fbn numbers on a per-file basis, whereas the file system assigns vbn numbers over a typically larger volume address space.

A read stream is defined as a set of one or more client requests that instructs the storage system to retrieve data from a logically contiguous range of file offsets within a requested file. In other words, after the read stream's first request is received, every subsequent client request in the read stream logically "extends" a contiguous sequence of file offsets in the file accessed by the stream's previous request. Accordingly, a read stream may be construed by the file system as a sequence of client requests that directs the storage system to retrieve a sequence of data blocks assigned to consecutively numbered fbns. For instance, the first request in the read stream may retrieve a first set of data blocks assigned to the fbns 10 through 19, the stream's second request may retrieve data blocks whose fbns equal 20 through 25, the third request may retrieve the data blocks assigned to the fbns 26 through 42, and so on. It is noted that client requests in the read stream may employ file-based or block-based semantics, so long as they instruct the storage system to retrieve data from the stream's logically contiguous range of file offsets.

Operationally, the storage system typically identifies a read stream based on an ordered sequence of client accesses to the same file. As used hereinafter, a file is broadly understood as any set of data in which zero or more read streams can be established. Accordingly, the file may be a traditional file or directory stored on a file-based storage system. Conventionally, the storage system can only monitor one file read stream at a time. To that end, the storage system determines whether a client's currently requested file data requires the storage system to retrieve a set of data blocks that logically extends a read stream already established in the file. If so, the client request may be associated with the read stream, and the read stream may be extended by the number of retrieved data blocks.

Upon identifying a read stream, the storage system may employ speculative readahead operations to retrieve data blocks that are likely to be requested by future client read requests. These "readahead" blocks are typically retrieved from disk and stored in memory (i.e., buffer cache) in the storage system, where each readahead data block is associated with a different file-system vbn. Conventional readahead algorithms are often configured to "prefetch" a predetermined number of data blocks that logically extend the read stream. For instance, for a read stream whose client read requests retrieve a sequence of data blocks assigned to consecutively numbered fbns, the file system may invoke readahead operations to retrieve additional data blocks assigned to fbns that further extend the sequence, even though the readahead blocks have not yet been requested by client requests in the read stream.

Typically, the readahead operations are "triggered" whenever a file's read stream reaches one of a predefined set of file offsets or memory addresses. For example, suppose the predefined set of file offsets consist of every $32^{nd}$ file offset in the file (i.e., file block numbers 0, 32, 64, etc.). Further suppose that an existing read stream begins at fbn number 4 and extends to fbn number 27. If a client read request is received that instructs the storage system to retrieve fbn numbers 28 through 34, the request extends the read stream past the predefined fbn number 32, thereby triggering readahead operations. Accordingly, the conventional readahead algorithm retrieves a predetermined number of data blocks, e.g., 288 data blocks, beginning with fbn number 35, from disk for storage in cache in anticipation of future read requests in that read stream.

One disadvantage of current storage systems is their inability to identify a read stream whose ordered sequence of read requests has been "interrupted" by other client requests. For instance, if the ordered sequence is interrupted, e.g., by one or more random read requests or by requests in other read streams, then the storage system can not distinguish the read stream's requests from the non-read stream requests. As a result, the storage system can not perform readahead operations for the unidentified read stream. For example, suppose a client issues "overlapping" read requests in different read streams. To a conventional storage system, the interleaved client requests appear to be random, non-ordered requests rather than belonging to separate read streams. In such a case, the storage system can not perform readahead operations for either of the interleaved read streams. Similarly, the storage system also may not perform readahead operations for read streams whose requests are interleaved with random client write requests.

Another disadvantage of conventional storage systems is their inability to identify a read stream whose read requests are received "nearly sequentially." Disordering of one or more of the read stream's requests may occur for various reasons. For instance, the client may issue the read-stream requests non-sequentially. Alternatively, the storage system may receive the client requests sequentially, although inherent latencies in retrieving the client-requested data causes the storage system to process the read-stream requests non-sequentially. In general, the storage system is not configured to identify nearly-sequential read requests as belonging to the same read stream, and thus readahead operations are not performed for the unidentified read stream.

It is therefore desirable for a storage system to identify an ordered sequence of read requests as belonging to the same read stream, even when the requests are interleaved with non-read stream requests or arranged nearly sequentially. Further, the storage system should be able to concurrently manage readahead operations for multiple read streams without negatively affecting the system's performance.

SUMMARY OF THE INVENTION

The present invention provides a storage system that implements a file system configured to concurrently perform speculative readahead for a plurality of different read streams for each file. Unlike previous implementations, the file system manages a separate set of readahead metadata for each of the plurality of read streams. Consequently, the file system can "match" a received client read request with a corresponding read stream, then perform readahead operations for the request in accordance with the read stream's associated set of metadata. Because received client read requests are matched to their corresponding read streams on a request-by-request basis, the file system can perform readahead operations even when read-stream requests are interleaved with non-read stream requests or arranged nearly sequentially.

According to an illustrative embodiment, each set of readahead metadata is stored in a corresponding readset data structure. The file system allocates a different set of zero or more readsets for each requested file in the storage system. In this way, each requested file can support a number of concurrent read streams equal to its number of allocated readsets (i.e., one read stream per readset). In the illustrative embodiment, a file's readsets are dynamically allocated in response to receiving an initial request to read data in the file. Preferably, the number of allocated readsets increases as the file's size increases.

Upon receiving a file read request, the file system attempts to match the request with a readset associated with the requested file. To that end, the request is sequentially compared with the file's readsets, preferably beginning with the most-recently accessed readset, until a readset is found that satisfies at least one predefined criterion. For example, a first criterion may test whether the received request "extends" one of the file's previously identified read streams. If so, the readset associated with the extended read stream is determined to be an "exact match." A second criterion may test whether the received request retrieves data located within a predetermined distance from the last read performed in a previously identified read stream. When this second criterion is satisfied, the readset associated with the read stream is determined to be a "fuzzy match." Yet a third criterion may determine whether any of the requested file's readsets is "empty" (i.e., unused) and therefore may be deemed to be an "empty match." After locating a matching readset (e.g., exact, fuzzy or empty), the file system performs readahead operations based on the readahead metadata stored in the matching readset.

In the event that no matching readset is found for the received read request, the file system may be configured to determine which of the requested file's existing readsets may be "reused." In such a case, the received read request is assumed to begin a new read stream, and the reused readset is reconfigured to store readahead metadata associated with the new read stream. Each readset includes an aging mechanism that may be used to determine whether the readset is eligible for reuse. Illustratively, a readset "ages" with respect to the other readsets whenever a received client read request is determined not to be an exact, fuzzy or empty match with any readset associated with the client-requested file. The aging mechanism may be used in conjunction with a readset reuse policy that prevents excessive "thrashing" of existing readsets. For example, the policy may ensure that a readset is not reused until at least a predetermined number of other readsets associated with the same file have been reused. As such, the reuse policy prevents the readsets' contents from being prematurely overwritten.

Advantageously, the present invention enables the file system to concurrently perform readahead operations for multiple read streams, regardless of whether the read streams' file read requests are received by the storage system in sequential, nearly-sequential or random orders. Further, the file system can concurrently perform speculative readahead for the plurality of different read streams, even when the read streams employ different readahead algorithms. The invention may be implemented by file-based or block-based storage systems, or combinations thereof.

BRIEF DESCRIPTION OF THE DRAWINGS

The above and further advantages of the invention may be better understood by referring to the following description in conjunction with the accompanying drawings in which like reference numerals indicate identically or functionally similar elements:

FIG. 5 is a schematic block diagram of an illustrative table that may be used to determine the number of readsets that may be allocated for a file or directory based on the size of the file or directory;

DETAILED DESCRIPTION OF ILLUSTRATIVE EMBODIMENTS

A. Storage System

Figure 1:
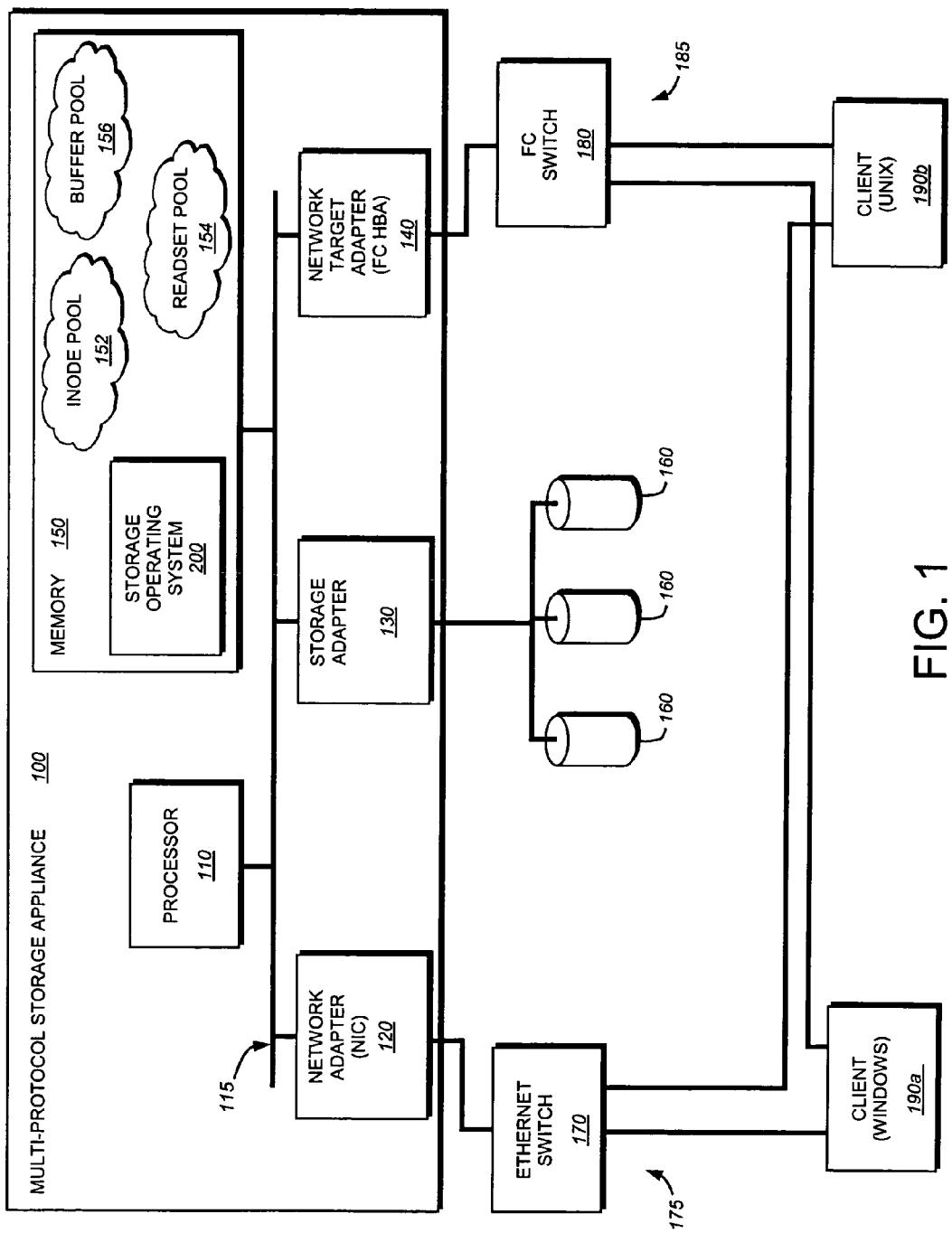
FIG. 1 is a schematic block diagram of an illustrative multiprotocol storage appliance environment that may be employed in accordance with the present invention.

FIG. 1 is a schematic block diagram of the multiprotocol storage appliance 100 configured to provide storage service relating to the organization of information on storage devices, such as disks 160. The storage disks may be arranged in various configurations, such as a redundant array of independent disks (RAID). The storage appliance 100 is illustratively embodied as a storage system comprising a processor 110, a memory 150, a plurality of network adapters 120, 140 and a storage adapter 130 interconnected by a system bus 115.

In the illustrative embodiment, the memory 150 comprises storage locations that are addressable by the processor 110 and adapters 120-140 for storing software program code and data structures associated with the present invention. For instance, the memory may store an inode "pool" 152 containing one or more inode data structures. Similarly, the memory may store a readset pool 154 containing readset data structures and a buffer pool 156 containing data buffers. The processor and adapters may comprise processing elements and/or logic circuitry configured to execute the software code and manipulate the data structures stored in the memory 150. A storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

To facilitate access to the disks 160, the storage operating system 200 implements a write-anywhere file system that cooperates with virtualization modules to "virtualize" the storage space provided by disks 160. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

As used herein, the term "storage operating system" generally refers to the computer-executable code operable on a computer that manages data access and may, in the case of a multiprotocol storage appliance, implement data access semantics. The storage operating system can be implemented as a microkernel, like the Data ONTAP™ operating system available from Network Appliance, Inc., Sunnyvale, Calif. The storage operating system can also be implemented as an application program operating over a general-purpose operating system, such as UNIX® or Windows NT®, or as a general-purpose operating system with configurable functionality, which is configured for storage applications as described herein. It is expressly contemplated that any appropriate storage operating system may be enhanced for use in accordance with the inventive principles described herein.

The storage adapter 130 cooperates with the storage operating system 200 executing on the storage appliance to access information requested by the clients 190. The information may be stored on the disks 160 or other similar media adapted to store information. The storage adapter includes input/output (I/O) interface circuitry that couples to the disks over an I/O interconnect arrangement, such as a conventional Fibre Channel (FC) serial link topology. The information is retrieved by the storage adapter and, if necessary, processed by the processor 110 (or the adapter 130 itself) prior to being forwarded over the system bus 115 to the network adapters 120, 140, where the information is formatted into packets or messages and returned to the clients.

The network adapter 120 couples the storage appliance 100 to a plurality of clients 190a,b over, e.g., point-to-point links, wide area networks (WANs), virtual private networks (VPNs) implemented over a public network (e.g., the Internet) or shared local area networks (LANs), such as the illustrative Ethernet network 175. Therefore, the network adapter 120 may comprise a network interface card (NIC) having the mechanical, electrical and signaling circuitry needed to connect the appliance to a network switch, such as a conventional Ethernet switch 170. For this NAS-based network environment, the clients are configured to access information stored on the multiprotocol appliance as files. The clients 190 communicate with the storage appliance over the network 175 by exchanging discrete frames or packets of data according to predefined protocols, such as the Transmission Control Protocol/Internet Protocol (TCP/IP).

The clients 190 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 190 may request the services of the storage appliance 100 by issuing file access protocol messages (in the form of packets) to the appliance over the network 175. For example, a client 190a running the Windows operating system may communicate with the storage appliance 100 using the Common Internet File System (CIFS) protocol over TCP/IP. On the other hand, a client 190b running the UNIX operating system may communicate with the multiprotocol appliance using either the Network File System (NFS) protocol over TCP/IP or the Direct Access File System (DAFS) protocol over a virtual interface (VI) transport in accordance with a remote direct memory access (RDMA) protocol over TCP/IP. It will be apparent to those skilled in the art that clients running other types of operating systems may also communicate with the integrated multiprotocol storage appliance using other file access protocols.

The storage network "target" adapter 140 couples the multiprotocol storage appliance 100 to clients 190 that may be configured to access the stored information as blocks, disks or logical units. For this SAN-based network environment, the storage appliance is coupled to an illustrative FC network 185. FC is a networking standard describing a suite of protocols and media that is primarily found in SAN deployments. The network target adapter 140 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload Fibre Channel network processing operations for the storage appliance.

The clients 190 generally utilize block-based access protocols, such as the Small Computer Systems Interface (SCSI) protocol, when accessing information, e.g., in the form of blocks or disks, over a SAN-based network. SCSI is a peripheral I/O interface with a standard, device independent protocol that allows different peripheral devices, such as disks 160, to attach to the storage appliance 100. In SCSI terminology, clients 190 operating in a SAN environment are initiators that initiate requests and commands for data. The multiprotocol storage appliance is thus a target configured to respond to the requests issued by the initiators in accordance with a request/response protocol. When clients send SAN-based data access requests to the storage appliance, clients typically utilize logical block addresses that correspond to individual data blocks stored on the disks 160.

The multiprotocol storage appliance 100 supports various SCSI-based protocols used in SAN deployments, including SCSI encapsulated over TCP/IP (iSCSI) and SCSI encapsulated over FC (FCP). The initiators (hereinafter clients 190) may thus request the services of the target (hereinafter storage appliance 100) by issuing iSCSI and FCP messages over the network 175, 185 to access information stored on the disks. It will be apparent to those skilled in the art that the clients may also request the services of the integrated multiprotocol storage appliance using other block access protocols. By supporting a plurality of block access protocols, the multiprotocol storage appliance provides a unified and coherent access solution to disks and logical units in a heterogeneous SAN environment.

B. Storage Operating System

Figure 2:
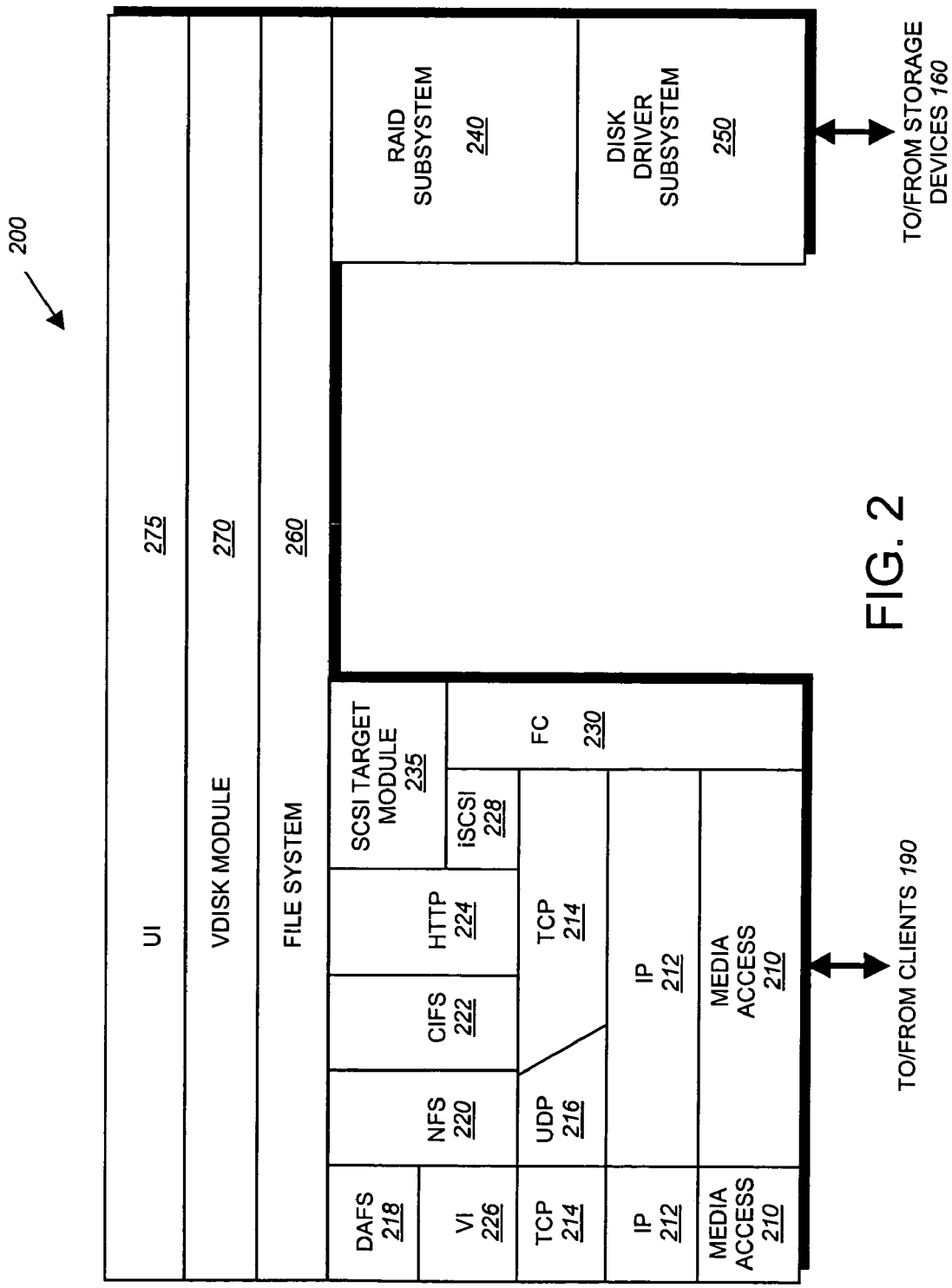
FIG. 2 is a schematic block diagram of an exemplary storage operating system of that may be advantageously used with the present invention.

FIG. 2 is a schematic block diagram of an exemplary storage operating system 200 that may be advantageously used with the present invention. The storage operating system comprises a series of software layers organized to form an integrated network protocol stack or, more generally, a multiprotocol engine that provides data paths for clients to access information stored on the multiprotocol storage appliance 100 using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multiprotocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block-based protocol access over the TCP/IP network protocol layers, while a FC driver layer 230 operates with the FC HBA 140 to receive and transmit block access requests and responses to and from the clients 190a,b. The FC and iSCSI drivers provide FC-specific and iSCSI-specific access control to the storage disks 160 and other logical units. In addition, the storage operating system 200 includes a RAID subsystem 240 that may implement a disk storage protocol, such as a RAID protocol, as well as a disk driver subsystem 250 for retrieving data blocks from the storage disks 160 in accordance with a disk access protocol such as, e.g., a SCSI protocol.

Bridging the disk software layers 240 and 250 with the integrated network protocol stack layers 210-230 is a virtualization system that is implemented by a storage manager or file system 260 interacting with virtualization modules illustratively embodied as, e.g., virtual disk ("vdisk") module 270 and SCSI target module 235. The vdisk module 270 is layered on the file system 260 to enable access by administrative interfaces, such as a user interface (UI) 275, in response to a user (system administrator) issuing commands to the storage system. The SCSI target module 235 is disposed between the FC and iSCSI drivers 228, 230 and the file system 260 to provide a translation layer of the virtualization system between the block (lun) space and the file-system space, where luns are represented as virtual disks. The UI 275 is disposed over the storage operating system in a manner that enables administrative or user access to various layers and subsystems, such as the RAID subsystem 240.

The file system 260 is illustratively a message-based system that provides volume management capabilities used to access information stored on the storage devices, such as the disks 160. That is, in addition to providing file-system semantics, the file system 260 provides functions normally associated with a volume manager. These functions include (i) aggregation of the disks, (ii) aggregation of storage bandwidth of the disks, and (iii) reliability guarantees, such as mirroring and/or parity (RAID). The file system 260 illustratively implements the Write Anywhere File Layout (WAFL™) file system, which is available from Network Appliance, Inc. and organizes its on-disk data using fixed-sized, e.g., 4 kilobyte (kB) blocks. The illustrative file system 260 uses index nodes ("inodes") to identify files and store file attributes (such as creation time, access permissions, size, and block location). The use of inodes, including an inode file, is described in more detail in U.S. Pat. No. 5,819,292, entitled *Method for Maintaining Consistent States of a File System and for Creating User-Accessible Read-Only Copies of a File System* by David Hitz, et al., issued Oct. 6, 1998, which patent is hereby incorporated by reference as though fully set forth herein.

Figure 3:
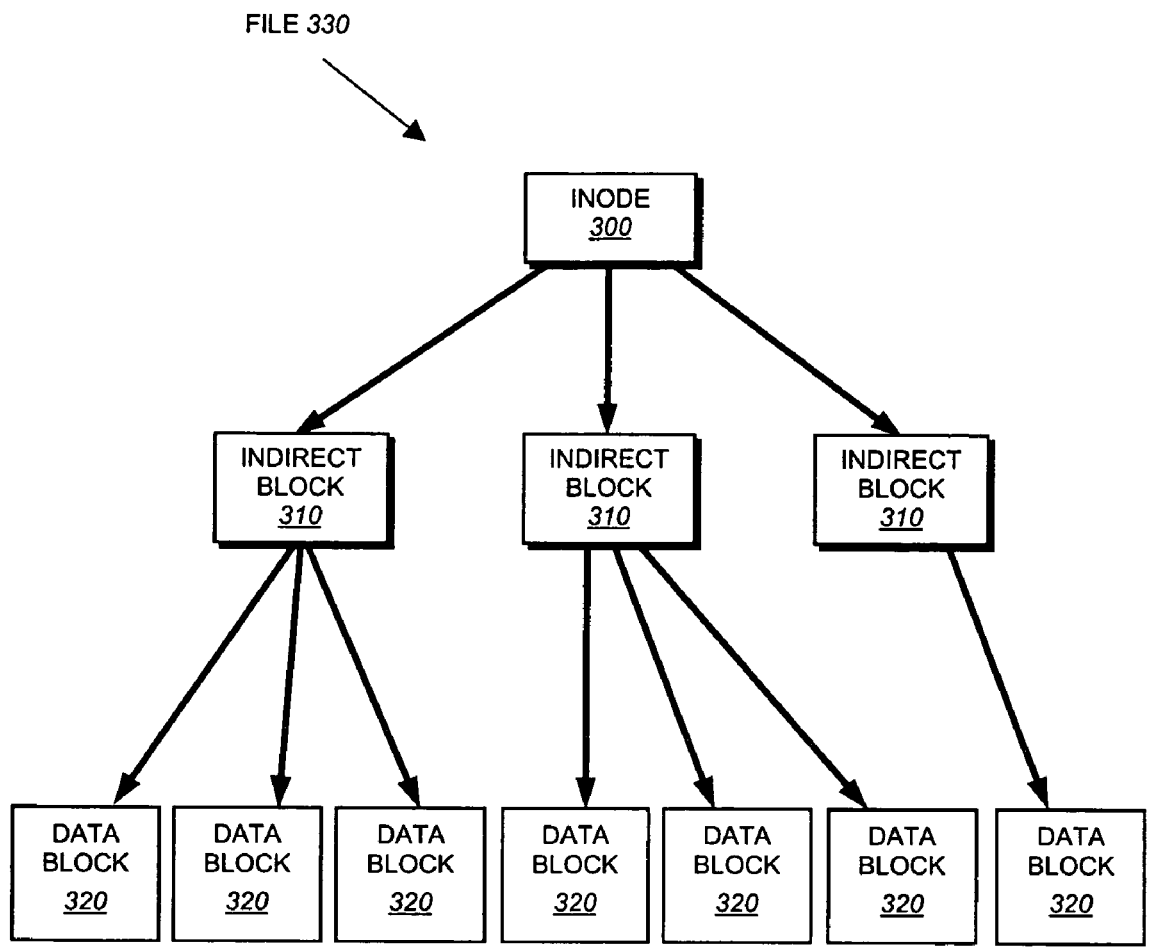
FIG. 3 is a schematic block diagram of an exemplary buffer tree that may be associated with a file or directory in the illustrative multiprotocol storage appliance.

FIG. 3 is a schematic block diagram of a buffer tree of file 330. The buffer tree is an internal representation of blocks of the file stored in memory. The buffer tree comprises a top-level inode 300 that contains metadata describing the file 330, and depending upon the size of the file, also contains pointers referencing the data blocks 320, e.g., 4 kB data blocks, that store the actual data of the file. In particular, for a large file (e.g., greater than 64 kB of data), each pointer in the inode 300 may reference an indirect (level 1) block 310 that contains up to 1024 pointers, each of which can reference a data block 320. By way of example, each pointer in the indirect blocks 310 may store a value identifying a vbn that corresponds to a data block 320 in the file system 260.

Operationally, the file system 260 receives client requests which have been processed by various software layers of the integrated network protocol stack. For example, a client request received at a network adapter 120 or 140 may be processed by a network driver (of layer 210 or 230) which, when appropriate, forwards the request to network protocol and file access layers 212-228 for additional processing. The client request is then formatted as a file-system "message" that can be passed to the file system 260. The message may specify, among other things, a client-requested file or directory (e.g., typically represented by an inode number), a starting offset within the requested file or directory, and a length of data to write or retrieve following the starting offset.

Because the file system 260 manipulates on-disk data in units of fixed-sized data blocks, e.g., 4 kB blocks, the file system may have to convert the (inode, offset, length) values received in the file-system message into units of data blocks (e.g., fbns), if they are not already so formatted. For example, suppose an 8 kB client-requested file occupies two consecutive 4 kB on-disk data blocks which are assigned fbns equal to 11 and 12, respectively. Further assume that these two data blocks are accessible through a set of pointers stored in an inode whose inode number equals 17. Next, suppose that a client requests to access the latter 6 kB of the file's data, i.e., the last 2 kB in fbn number 11 and the entire 4 kB in fbn number 12. In this case, the file system 260 may receive a file-system message that identifies the requested data as: (inode=17, file offset=2 kB, length=6 kB). Since the file system manipulates data in units of data blocks, the file system converts the received file offset and length values into units of data blocks so as to identify which data blocks contain the client-requested data, e.g., (inode=17, starting data block=fbn 11, data blocks to read=2 blocks).

Having identified which data blocks, e.g., fbns 11 and 12, store the client-requested data, the file system 260 determines whether the client-requested data blocks are accessible in one or more of the "in-core" buffers. If so, the file system retrieves the requested data from memory 150 and processes the retrieved data in accordance with the client request. However, if the requested data is not resident in the in-core memory 150, the file system 260 generates operations to load (retrieve) the requested data from the storage disks 160. The file system passes a message structure identifying the vbn numbers assigned to the client-requested data blocks (i.e., fbns 11 and 12) to the RAID subsystem 240, which maps the vbns to corresponding disk block numbers (dbn) and sends the latter to an appropriate driver (e.g., SCSI) of the disk driver subsystem 250. The disk driver accesses the requested dbns from the disks 160 and loads the requested data block(s) in memory 150 for processing by the file system 260.

In addition to retrieving data blocks containing the client-requested data, the file system 260 also may instruct the disk software layers 240 and 250 to retrieve additional "readahead" data blocks from the disks 160. These readahead data blocks may correspond to a range of data blocks (e.g., fbns) that logically extend a read stream containing the received client request, although the readahead blocks themselves have not yet been requested. Like the client-requested data blocks, the readahead data blocks are retrieved by the disk software layers 240 and 250 and copied into appropriate memory buffers accessible to the file system 260. Such memory buffers may be obtained from the buffer pool 156. The file system may access (i.e., read or write) the client-requested data in the retrieved data blocks in accordance with the client's request, and, when appropriate, return the requested data and/or an acknowledgement message back to the requesting client 190.

C. Readsets

As used herein, a "read stream" is defined as a set of one or more client requests that instructs the storage operating system 200 to retrieve data from a logically contiguous range of file offsets (e.g., fbns) within a requested file. The operating system may employ speculative readahead operations for prefetching one or more data blocks that are likely to be requested in the read stream by future client read requests. In accordance with an illustrative embodiment, the storage operating system 200 maintains a separate set of readahead metadata for each of a plurality of concurrently managed read streams. In the illustrative embodiment, the operating system stores each read stream's metadata in a separate "readset" data structure (i.e., one read stream per readset). Accordingly, a file or directory supporting multiple concurrent read streams may be associated with a plurality of different readsets, e.g., accessible through an inode associated with the file or directory.

Figure 4:
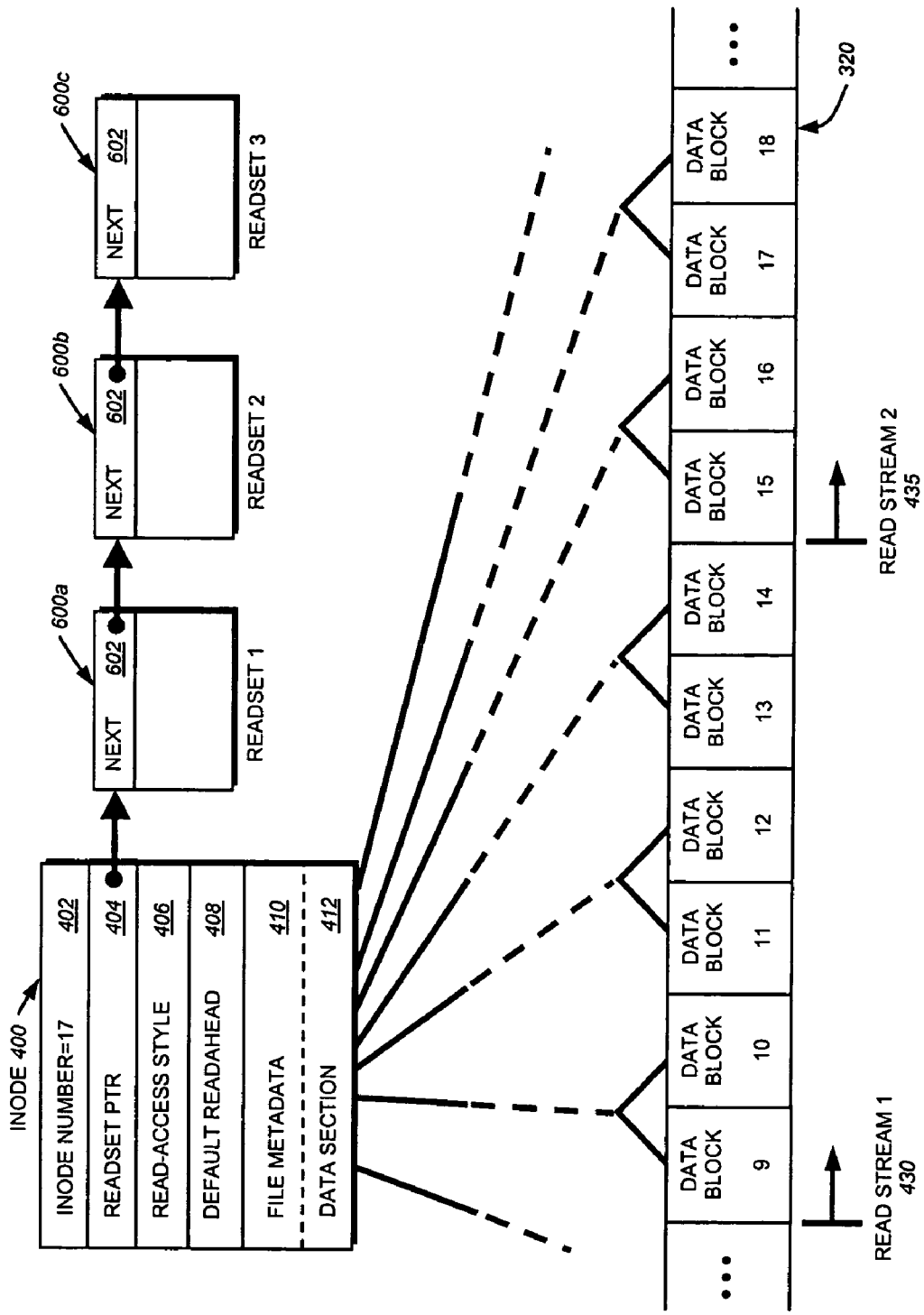
FIG. 4 is a schematic block diagram of an inode and an exemplary set of readset data structures that may be used to store readahead metadata for read streams established in the inode's associated file or directory.

FIG. 4 illustrates an exemplary inode 400 and its associated set of readsets 600*a-c*. The inode 400 comprises, inter alia, an inode number 402 (or other identifier), a readset pointer 404, a read-access style 406, a default readahead value 408, file metadata 410 and a data section 412. The inode 400 may be dynamically allocated or obtained from the inode pool 152 in response to the storage operating system 200 receiving a client request to access data in the inode's associated file or directory. The inode number 402, e.g., which equals 17 in this example, may be used to uniquely identify the file or directory associated with the inode 400. For instance, the client request may specify an inode number whose associated file or directory contains a particular range of data that the client desires to access. The client-specified inode number may be coupled with an indication of a starting offset in the file and a length of data to access beginning at the starting offset.

The readset pointer 404 stores a value that indicates the memory location of zero or more readset data structures 600. In operation, the file system 260 may dynamically allocate the readsets or acquire previously allocated readsets from a readset pool 154. Each readset allocated for the inode 400 may be initialized to store a predetermined set of values. Illustratively, the readsets 600*a-c* associated with the inode 400 are arranged as a linked list, wherein each readset comprises a "next" pointer 602 that stores a value indicating the memory location of an adjacent readset in the list. The next pointer in the list's last readset, e.g., readset 600*c*, may store a predetermined "null" value to indicate that it is at the end of the list. While readsets in the illustrative embodiment are arranged as a linked list, those skilled in the art will appreciate that the readsets may be arranged in other configurations, such as a search tree.

The read-access style 406 stores a value indicating a read-access pattern that describes the manner by which data is read from the file or directory associated with the inode 400. For instance, the read-access style may indicate that data in the inode's file or directory will be read according to, e.g., a normal, sequential or random access pattern. The storage operating system 200 may dynamically identify and update the read-access pattern value 406 as it processes client read requests. Alternatively, the operating system may set the read-access value based on a "cache hint" or the like included in a received client read request. The cache hint indicates a read access pattern that the requesting client will likely employ to retrieve data from the file or directory. For example, the operating system may obtain the cache hint from a DAFS read request forwarded by a client. The DAFS protocol, including the DAFS cache hint, are described in more detail in *DAFS: Direct Access File System Protocol, Version* 1.00, published Sep. 1, 2001, which is hereby incorporated by reference as though fully set forth herein.

The default readahead value 408 indicates a predetermined number of data blocks that may be prefetched (i.e., read in advance) in anticipation of future client read requests for data stored in the inode 400's associated file or directory. For instance, the default readahead value 408 may indicate that after retrieving one or more data blocks containing client-requested data, the file system should retrieve an additional, e.g., 288 data blocks, in anticipation of future client read requests. Those skilled in the art will recognize that the "readahead" data blocks need not be retrieved after every client read request, and instead may be acquired based on a predetermined readahead algorithm. In accordance with the illustrative embodiment, the default readahead value 408 may depend on the read-access style 406. For example, the default readahead value may equal zero for random read access patterns and may equal a relatively larger value for sequential read accesses than for normal read accesses.

The file metadata 410 stores other metadata information related to the file or directory associated with the inode 400. Such metadata information may include, inter alia, security credentials, such as user identifiers and group identifiers, access control lists, flags, pointers to other data structures, and so forth. The inode 400 also includes a data section 412 including a set of pointers that (directly or indirectly) reference the memory locations of the data blocks 320 containing the inode's associated file or directory. In this example, the pointers in the data section 412 reference one or more indirect blocks (not shown), which in turn contain pointers that reference the memory locations of a set of contiguous data blocks containing the file or directory. Hereinafter, it is assumed that each of the data blocks accessible from the inode 400 is assigned a corresponding fbn and the file (or directory) associated with the inode 400 comprises a set of data blocks which are assigned consecutive fbn values. For example, some of the pointers in the data section 412 may reference a portion of the file stored in the data blocks assigned to the fbns numbered 9 through 18.

Advantageously, multiple read streams may be concurrently established among the data blocks 320 containing the inode 400's file or directory. As shown, for example, two concurrent read streams 430 and 435 are identified in the set of data blocks 9 through 18. The read stream 430 corresponds to a logically contiguous sequence of fbns retrieved by the file system 260 up to, but not including, the file block number 9. Similarly, the read stream 435 corresponds to a logically contiguous sequence of fbns retrieved up to, but not including, the file block number 15. In accordance with the illustrative embodiment, each of these read streams may be associated with a respective set of readahead metadata stored in a different one of the readsets 600*a-c*.

As noted, each readset is configured to store metadata associated with a corresponding read stream. Therefore, because the illustrative inode 400 is associated with three readsets 600*a-c*, the inode's associated file or directory can support up to three different read streams. However, it is expressly contemplated that the inode may be associated with an arbitrary number of zero or more allocated readsets 600. Preferably, the number of readsets allocated for the inode 400 is determined based on the size of the inode's associated file or directory. For example, as the file's size increases, the number of readsets allocated for the inode also may increase.

FIG. 5 illustrates an exemplary table 500 that may be used to correlate file sizes stored in column 510 with corresponding numbers of allocated readsets stored in column 520. In this example, a "tiny" file (e.g., <64 kB) may not contain enough data to establish any read streams and is therefore associated with zero readsets. On the other hand, a "small" file (e.g., 64 kB-512 kB) may be large enough to support a single read stream and is therefore associated with a single readset. Generally, as the file size increases, the number of read streams the file can support increases and thus the number of readsets allocated to the file's inode may also increase. The file system 260 may dynamically allocate more readsets as a file's size is dynamically increased, e.g., as a result of processing one or more client "write" requests.

Figure 6:
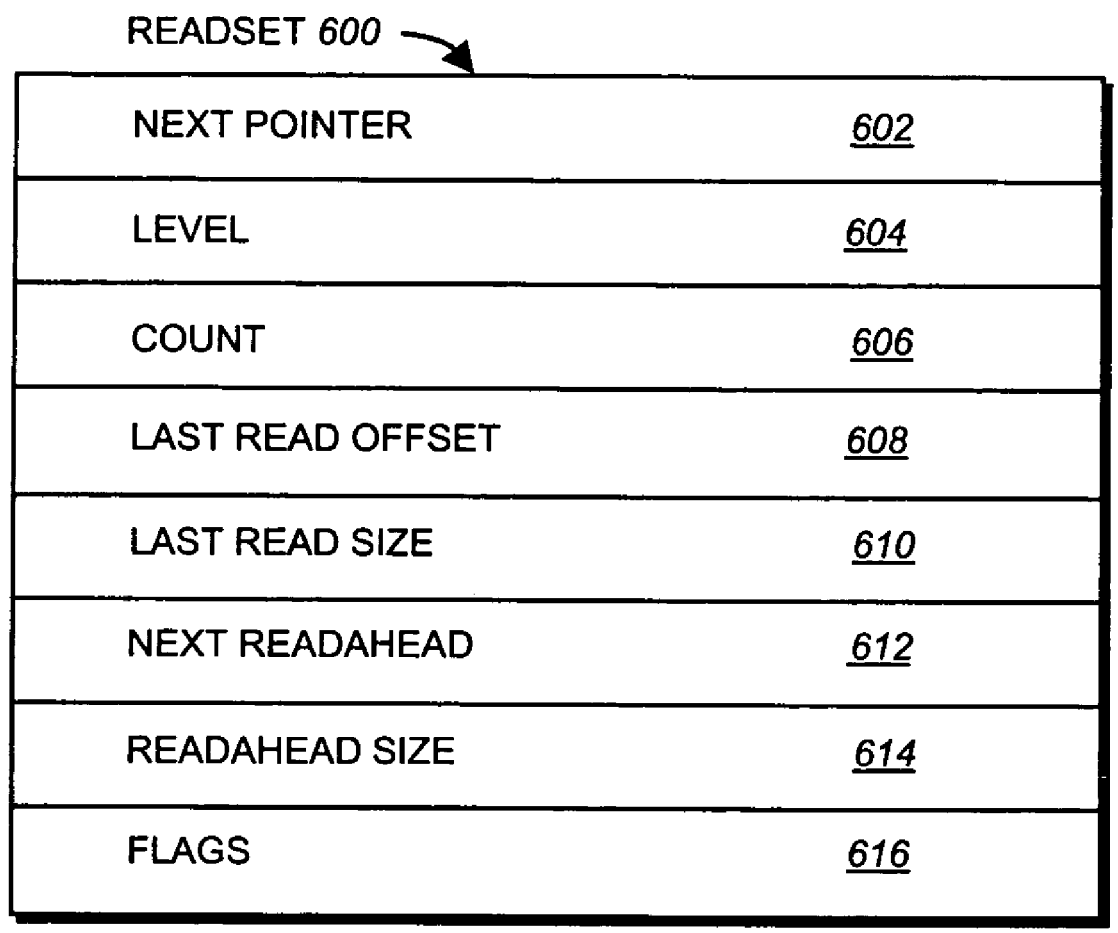
FIG. 6 is a schematic block diagram of an illustrative readset that advantageously may be employed in accordance with the present invention.

FIG. 6 illustrates an exemplary readset 600 which may be accessed via the readset pointer 404. The readset contains metadata associated with a corresponding read stream, such as the read stream 430 or 435. The readset 600 may comprise, inter alia, a next pointer 602, a level value 604, a count value 606, a last read offset value 608, a last read size 610, a next readahead value 612, a readahead size 614 and various flags 616. Those skilled in the art will understand that the readset 600 also may be configured to store other information as well, besides that explicitly shown. As previously discussed, the next pointer 602 stores a value that indicates the memory location of an adjacent readset in a list (or other data structure) of readsets.

The level value 604 indicates the relative "age" of the readset 600. Preferably, the level value is an integer value bounded between a predetermined upper-bound value and a predetermined lower-bound value, inclusive. For example, the level value 604 may be restricted to integer values between a predetermined lower-bound value equal to zero and a predetermined upper-bound value equal to 20. When the readset 600 is initially allocated, the level value 604 is set equal to a special indicator value, such as negative one, to indicate that the readset 600 is unused (i.e., empty). When the readset is associated with a newly identified read stream, the level value 604 is set equal to a predetermined "initial" value between the upper- and lower-bound values, inclusive. For example, when the predetermined lower- and upper-bound values respectively equal zero and 20, the initial level value may equal any value therebetween, such as 10. Preferably, the initial level values used for large files (or directories) associated with the readset 600 are greater than the initial level values used for smaller files to help prevent the readset from aging prematurely. For instance, the initial level value may be set equal to 15 for very large files (e.g., greater than 10 GB) and set equal to 10 otherwise. It is expressly contemplated that other upper-bound, lower-bound and initial level values may be employed in the context of the present invention.

Every time a client read request is processed by the file system 260, the file system increments the level value 604 in the readset associated with the read stream containing the client read request. Illustratively, when the level value 604 is incremented, it is increased by a first predetermined step size, e.g., equal to one. Further, whenever a readset is "reused," e.g., as discussed below, the file system decrements the level values 604 stored in every readset not selected for reuse. The level values 604 may be decremented by a second predetermined step size, e.g., equal to one.

By way of example, suppose the readset 600 stores a level value 604 equal to 12 and the file system 260 receives a file-system message corresponding to a client read request. If the file system determines that the client read request belongs to the read stream associated with the readset 600, then the level value 604 is incremented to equal 13. On the other hand, if the client read request is determined to belong to a different read stream, i.e., not associated with the readset 600, then the level value 604 is left unchanged, i.e., equal to 12. Further, if the received client read request results in the file system having to reuse a different readset, the level value 604 is decremented, e.g., to equal 11. The level value 604 may be adjusted (i.e., "aged") in this manner after every client read request is processed by the file system 260, until the readset 600 is deallocated or reused, as described below. This aging process may be subject to various conditions. For example, if the level value 604 is decremented to a value that is less than the predetermined initial value (e.g., equal to 10), then the next time the level value is incremented, the level value may be set equal to the predetermined initial level value. Further, the file system 260 may ensure that the level value 604 is not incremented past its predetermined upper-bound value nor decremented below its predetermined lower-bound value.

The count value 606 stores the number of client read requests that have been processed in the read stream associated with the readset 600. In the illustrative embodiment, the count value is initially set equal to zero. The count value is then incremented by one every time the file system 260 processes a client read request included in the readset's associated read stream. Like the level value 604, the count value 606 may be bounded by a predetermined upper-bound value, e.g., $2^{16}$, so as to conserve memory resources in the multiprotocol storage appliance 100.

The last read offset 608 and last read size 610 collectively describe the last (i.e., most recent) client read request processed in the read stream associated with the readset 600. Preferably, the last read offset 608 and last read size 610 store values in units of data blocks (e.g., fbns). For instance, suppose the file system 260 retrieves three data blocks, beginning with the file block number 6 (i.e., fbn numbers 6, 7 and 8), in response to processing the last client read request received in the read stream associated with the readset 600. In this case, the last read offset 608 is set equal to fbn number 6 and the last read size 610 is set equal to 3 data blocks. Accordingly, a future client read request may "extend" the read stream associated with the readset 600 if it requires the file system to retrieve another sequence of logically contiguous data blocks beginning with the file block number 9.

The next readahead value 612 stores an indication of a predefined file offset or memory address where the file system 260 will perform its next set of readahead operations for the read stream associated with the readset 600. Specifically, when a client read request extends the read stream past the file offset or memory address indicated by the next readahead value 612, the file system may speculatively retrieve an additional set of readahead data blocks that further extend the read stream in anticipation of future client read requests. The readahead size value 614 stores the number of readahead data blocks that is prefetched. The readahead size value 614 may equal the default readahead value 408 or may be otherwise determined in accordance with a readahead algorithm. Having retrieved the readahead data blocks, the file system 260 may update the next readahead value 612 to indicate the next file offset or memory address where readahead operations will be performed for the read stream. After the readahead data blocks are retrieved, they are copied into appropriate in-core memory buffers in the memory 150 and the file system finishes processing the client read request.

Each readset 600 may include one or more flag values 616 that enable the file system 260 to specialize readahead operations for the readset's associated read stream. For instance, one of the flag values may indicate in which "direction" the file system should speculatively retrieve data blocks for the read stream. That is, the file system may be configured to retrieve data blocks in a logical "forward" direction (i.e., in order of increasing data block numbers) or in a logical "backward" direction (i.e., in order of decreasing data block numbers). Other flag values 616 may indicate whether the readahead data blocks contain "read-once" data and therefore should not be stored in the memory 150 for a prolonged period of time.

D. Matching Client Requests to Readsets

Upon receiving a client read request, the file system 260 attempts to "match" the request with a preexisting readset 600. In accordance with the illustrative embodiment, the request is determined to match a readset if it satisfies at least one predefined criterion. For example, a first criterion may test whether the received request "extends" a previously identified read stream. If so, the readset associated with the extended read stream is determined to be an "exact match." A second criterion may test whether the received request retrieves data located within a predetermined distance from the last read performed in a previously identified read stream. When this second criterion is satisfied, the readset associated with the read stream is determined to be a "fuzzy match." Yet a third criterion may determine whether any of the readsets associated with the client-requested file or directory is "empty" (i.e., unused) and therefore may be deemed to be an "empty match." After locating a matching readset (e.g., exact, fuzzy or empty), the operating system performs readahead operations based on the readahead metadata stored in the matching readset.

Figure 7:
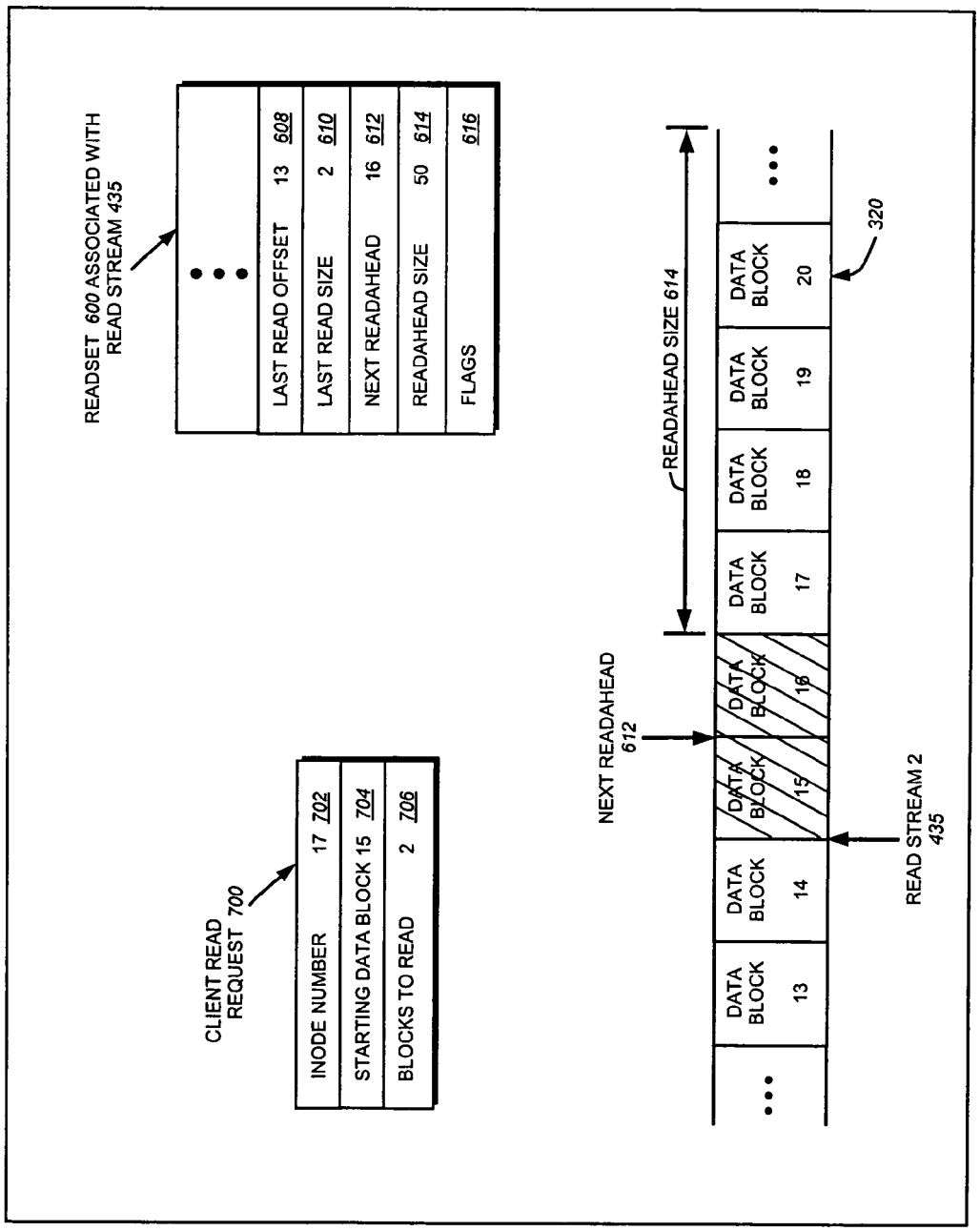
FIG. 7 is a schematic block diagram of a received client read request that may be determined to be an "exact match" with a readset associated with a preexisting read stream.

FIG. 7 illustrates an exemplary client read request 700 that logically extends the read stream 435. More specifically, the client read request is received at the multiprotocol storage appliance 100 and processed by one or more layers of the integrated network protocol stack implemented by the storage operating system 200. A file-system protocol engine, such as one of the protocol engines 218-230, formats the received client request as a file-system message which is forwarded to the file system 260. The file-system message includes various information that enables the file system to retrieve the client's requested data. For example, the file-system message may include, among other things, an indication of an inode number, a file offset and a length of data to retrieve. In this example, the file-system message is embodied as the client read request 700 in which the file offset and length of data to retrieve are specified in units of data blocks. Specifically, the read request 700 includes, inter alia, an inode number 702, a starting data block 704 and a number of data blocks to read 706.

For purposes of discussion, assume the inode number equals 17, the starting data block number (e.g., fbn) equals 15 and the number of data blocks to read is 2. Accordingly, the client read request 700 instructs the file system 260 to locate the file data blocks 15 and 16 in the file or directory associated with the inode number 17. The file system first may attempt to locate the data blocks in its in-core memory buffers to determine whether the data blocks were recently retrieved as a result of a previously processed client request. If either one or both of the data blocks 15 and 16 is not present in the memory buffers, the file system 260 cooperates with the storage subsystem 250 (e.g., RAID and disk driver layers) to retrieve the unlocated data blocks from the storage disks 160. In such a case, the data blocks retrieved from disk are copied into one or more memory buffers, e.g., acquired from the buffer pool 156.

FIG. 7 illustrates a portion of a readset 600 associated with the read stream 435. As indicated by the values 608 and 610 stored in the readset, the last client read request processed in the read stream 435 results in the file system retrieving a logically contiguous sequence of two data blocks, beginning with the file block number 13 (i.e., fbn numbers 13 and 14). Because the starting data block value 704 in the client read request 700 instructs the file system to retrieve the fbn numbers 15 and 16, the file system can determine that the request logically extends the read stream 435. Consequently, the readset 600 associated with the read stream 435 is deemed to be an exact match for the client read request 700.

Since the file system retrieves file block numbers 15 and 16 (shown as shaded data blocks) in response to the received file-system read request 700, the read stream 435 is extended past the beginning of the fbn number 16 designated by the next readahead value 612. Therefore, the file system 260 retrieves 50 readahead data blocks, as specified by the readahead size value 614, beginning with the next logical data block in the read stream 435 (i.e., fbn number 17). Although the number of readahead data blocks retrieved is preferably determined by the readahead size value 614, the number of readahead data blocks alternatively may be determined by other information, such as the default readahead size 406 stored in the inode number 17.

The file system 260 retrieves the readahead data blocks in the same or similar manner as it retrieved the client-requested data blocks 15 and 16. Namely, the file system first may attempt to retrieve the readahead data blocks from the in-core memory buffers, and then may cooperate with the storage subsystem 250 to retrieve those readahead data blocks not present in the in-core buffers from the storage disks 160. Like the client-requested data blocks retrieved from the disks, the readahead data blocks may be copied into in-core data buffers. However, because of the speculative nature of the readahead data blocks, i.e., they were not explicitly requested by a client 190, the in-core memory buffers containing the readahead data may be configured to retain the readahead data in the memory 150 for a relatively shorter period of time than the in-core data buffers retain the clients' explicitly requested data blocks.

It is also noted that the file system 260 may rely on other information associated with the read stream 435, such as the flag values 616, while retrieving the readahead data blocks. For instance, the value of an exemplary flag 616 may notify the file system to forgo retrieval of readahead blocks, even when the read stream 435 is extended past the data block number or memory address specified by the next readahead value 612. In this situation, the value of the flag 616 may reflect that the read-access style 406 associated with the client-requested file or directory indicates that the file or directory is accessed using, e.g., a random read-access style.

In addition to retrieving the file block numbers 15 and 16 and their corresponding readahead data blocks, the file system also updates the contents of the readset 600 associated with the read stream 435. For instance, the last read offset value 608 may be modified to correspond with the starting data block number 704. Likewise, the last read size value 610 may be updated to equal the number of data blocks 706 specified in the read request 700. Moreover, the readahead values 612-616 also may be modified, e.g., in accordance with a predefined readahead algorithm associated with the read stream 435.

Figure 8:
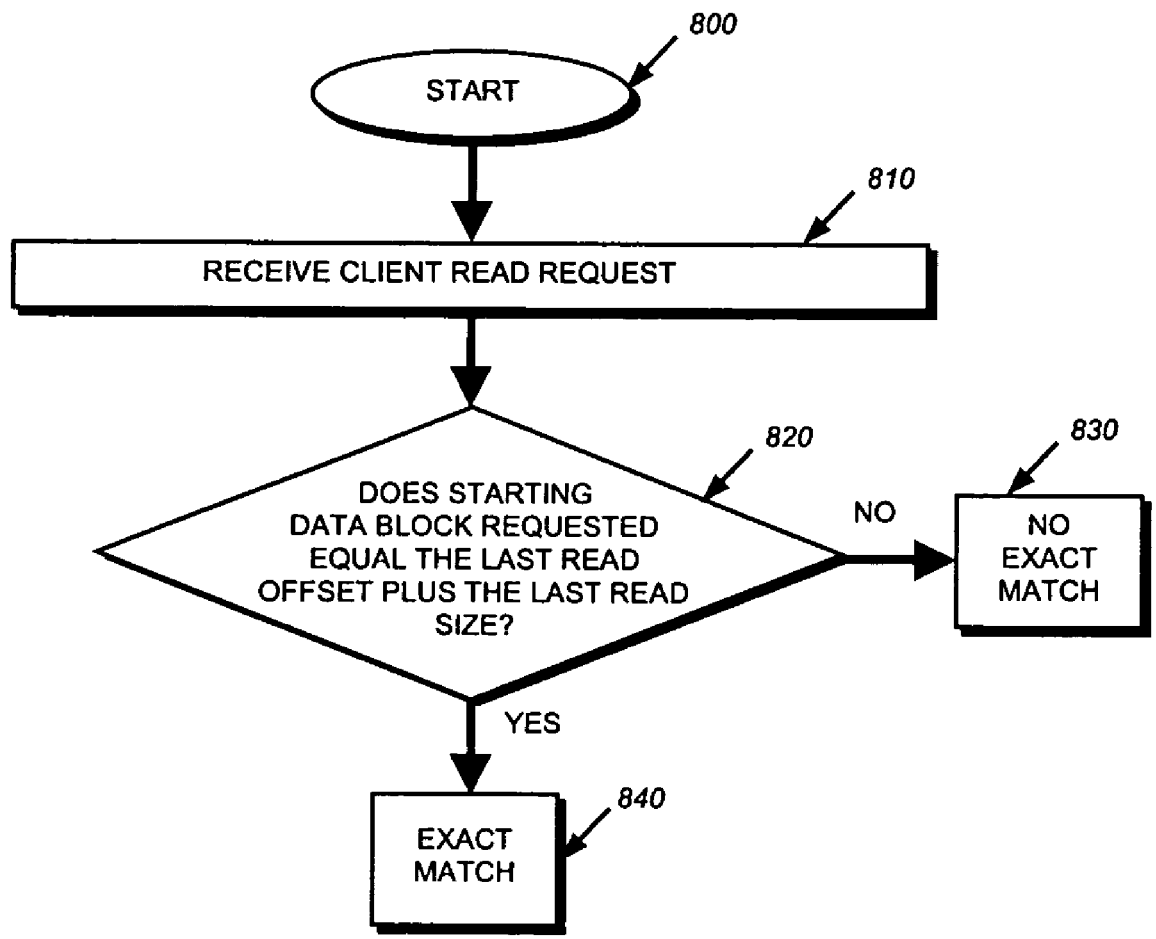
FIG. 8 is a flowchart illustrating a sequence of steps that may be performed for determining whether a received client request is an exact match with a readset associated with a preexisting read stream.

FIG. 8 illustrates a sequence of steps for determining whether a readset 600 is an exact match for a received client read request 700. The sequence starts at step 800 and proceeds to step 810 where the client read request is received by the file system 260. At step 820, the starting data block 704 specified in the received client read request is compared with the sum of the last read offset 608 and the last read size 610 stored in the readset 600. If the values are determined to be equal, then the sequence advances to step 840 where the file system determines that the readset 600 is an exact match for the received client read request 700, since the request logically extends the read stream associated with the readset 600. If the determination at step 820 is negative, then at step 830 the readset 600 is not determined to be an exact match for the received request 700. In this latter case, the steps 820-840 may be repeated for other readsets 600 associated with the client-requested file or directory until an exact match is identified or there are no more readsets to test.

Figure 9:
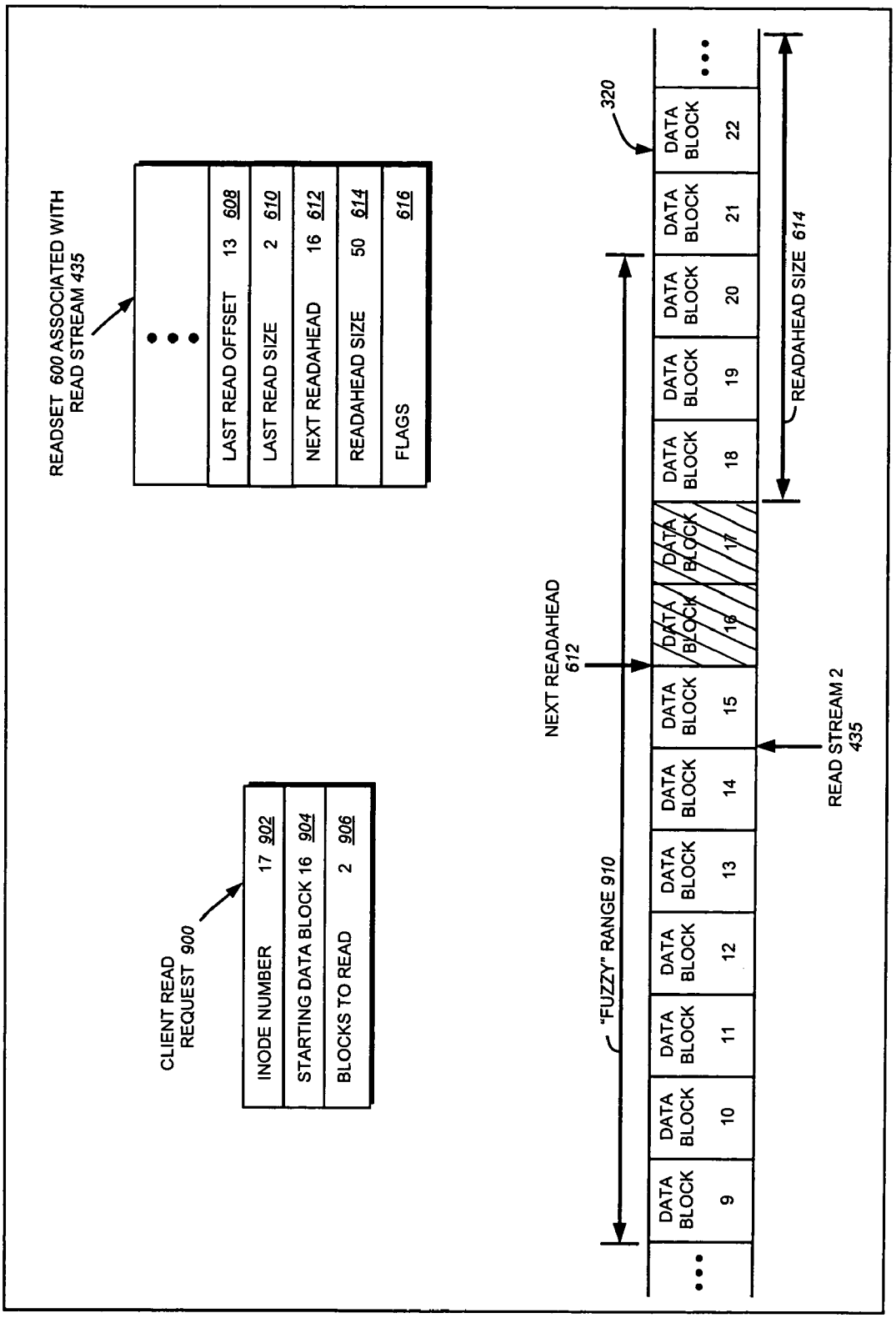
FIG. 9 is a schematic block diagram of a received client read request that may be determined to be an "fuzzy match" with a readset associated with a preexisting read stream.

FIG. 9 illustrates an exemplary client read request 900 that does not logically extend the read stream 435, but instead corresponds to a "nearly sequential" client read request. That is, the request 900 does not exactly extend the read stream 435 like a sequential read request, although it is sufficiently close to extending the read stream as to be deemed nearly sequential. In accordance with the illustrative embodiment, the file system 260 may identify a "fuzzy" range 910 that may extend in both the forward and backwards directions with respect to the last data block retrieved in the read stream 435, i.e., the file block number 14. The fuzzy range 910 is preferably derived based on a multiple of a number of blocks to read 906 specified in the read request 900. For example, as shown, the fuzzy range 910 spans a multiple of three times the number of client-requested data blocks in both the forward and backward directions. More specifically, because two data blocks are requested in the request 900, the fuzzy range spans six data blocks in the backwards direction (e.g., file block numbers 9-14) and six data blocks in the forward direction (e.g., file block numbers 15-20).

Although the illustrative embodiment illustrates a symmetric fuzzy range 910 around the last data block retrieved in the read stream 435 (i.e., file block number 14), it is also expressly contemplated that the fuzzy range may be asymmetric around the last retrieved data block. In other words, the fuzzy range 910 generally may extend a first number of data blocks in the backwards direction and a second number of data blocks in the forward direction. For example, different multiplicative factors of the number of client-requested data blocks 906 may be used to derive the length of the fuzzy range 910 in the forward and backwards directions, respectively.

As shown in FIG. 9, the client read request 900 specifies an inode number 902 equal to 17, a starting data block number 904 equal to 16 and a number of data blocks to read 906 equal to 2. In response to receiving this client read request, the file system 260 locates the fbns 16 and 17 in the file or directory associated with the inode number 17. As described with respect to FIG. 7, the file system may first attempt to locate the data blocks in the in-core memory buffers. The file system 260 then cooperates with the storage subsystem 250 (e.g., RAID and disk driver layers) to retrieve any data blocks that are not located in the in-core memory buffers from the storage disks 160.

Because the readset 600 indicates that the last read request processed in the read stream 435 resulted in the file system 260 retrieving two data blocks beginning with the file block number 13 (e.g., file block numbers 13 and 14), the retrieved fbn numbers 16 and 17 do not logically extend the read stream 435. In fact, the file block number 15 is effectively "skipped" in the read stream 435. Thus, the read request 900 is not an exact match for the readset 600 associated with the read stream 435. However, the starting data block number 16 specified in the request 900 is within the illustrative fuzzy range 910. As a result, the request 900 is determined to "fuzzily" match the readset 600 associated with the read stream 435, and the file system 260 subsequently processes the client read request 900 as if it were an exact match.

Having determined that the client read request 900 is a fuzzy match for the readset 600 associated with the read stream 435, the file system 260 determines whether the request triggers readahead operations in the read stream. For instance, because the retrieved data blocks 16 and 17 surpass the fbn number 16 indicated by the next readahead value 612, the file system performs readahead operations for the read stream 435 even though the client request is a fuzzy match and not an exact match. The file system pre-fetches a number of data blocks indicated by the readahead size value 614, beginning with the next logical data block in the read stream (i.e., the file block number 18). Although the number of readahead data blocks retrieved is preferably determined by the readahead size value 614, the number of readahead data blocks alternatively may be determined by other information, such as the default readahead size 406 stored in the inode number 17.

In addition to retrieving the data blocks corresponding to the fbn numbers 16 and 17 and their corresponding readahead data blocks, the file system updates the contents of the readset 600 associated with the read stream 435. For instance, the last read offset value 608 may be modified to correspond with the starting data block number 904. Likewise, the last read size value 610 may be updated to equal the number of data blocks 906 specified in the read request 900. Moreover, the readahead values 612-616 also may be modified, e.g., in accordance with a predefined readahead algorithm associated with the read stream 435.

Figure 10:
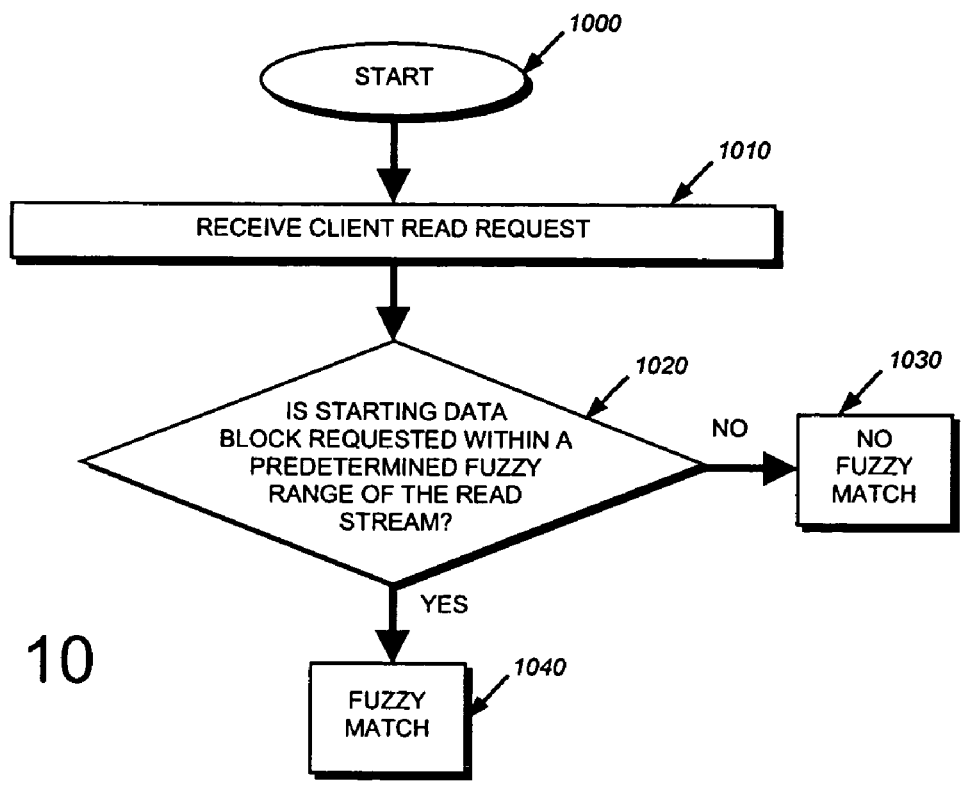
FIG. 10 is a flowchart illustrating a sequence of steps that may be performed for determining whether a received client request is a fuzzy match with a readset associated with a preexisting read stream.

FIG. 10 illustrates a sequence of steps for determining whether a readset 600 is a fuzzy match with a received client read request 900. The sequence starts at step 1000 and proceeds to step 1010 where the client read request is received by the file system 260. At step 1020, the starting data block 904 specified in the received read request is compared with a predefined range of file block numbers included in a fuzzy range 910. The fuzzy range may be derived as a multiple of the number of data blocks 906 specified in the read request 900. If the starting data block value is determined to be within the predetermined fuzzy range, then the sequence advances to step 1040 where the file system determines that the received client read request is a fuzzy match. Otherwise, at step 1030, the received client read request is not determined to be a fuzzy match to the readset 600. In this latter case, the steps 1020-1040 may be repeated for other readsets 600 associated with the client-requested file or directory until a fizzy match is identified or there are no more readsets to test.

When a received client read request is not an exact match or a fuzzy match to a readset 600 associated with the client-requested data, the file system 260 then may associate the received request with a new read stream. Accordingly, the file system 260 may check whether there are any unused, or "empty" readsets 600 which may be used to store metadata associated with the new read stream. In this context, a readset is empty when its level value 604 equals a special indicator value, such as negative one, that indicates that the readset has not been used. As previously noted, the level value 604 is set equal to the special indicator value only when it is allocated; after the readset 600 is first used to store read-stream metadata, the level value 604 is bounded by its predetermined upper-bound and lower-bound level values thereafter.

Figure 11:
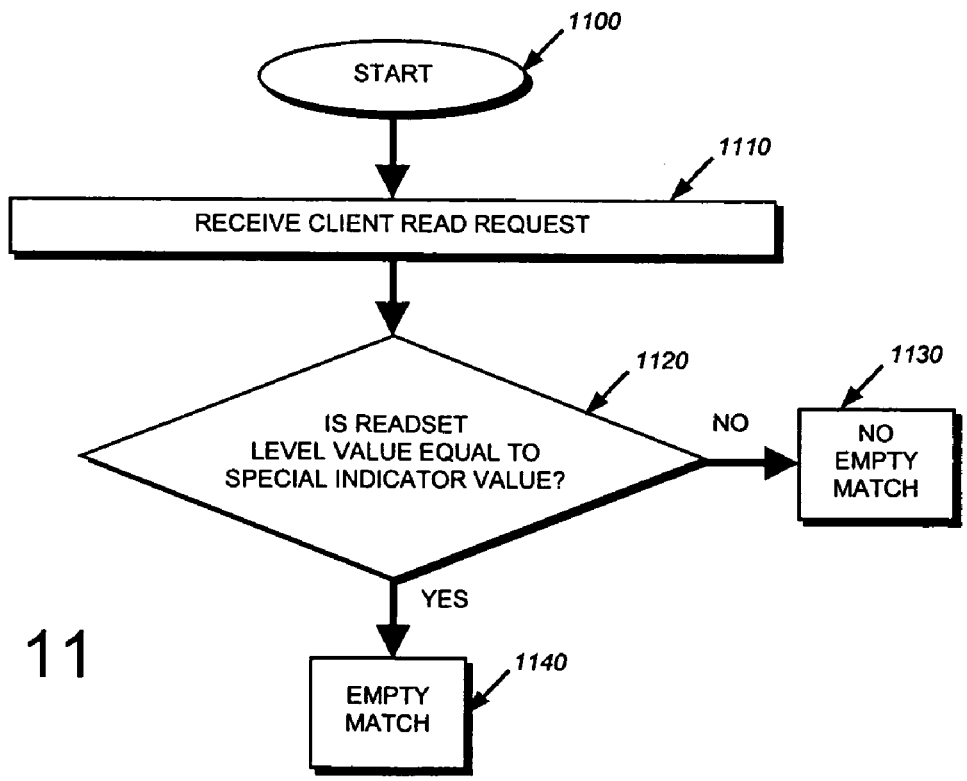
FIG. 11 is a flowchart illustrating a sequence of steps that may be performed for determining whether a received client request is an "empty match" with a readset associated with a preexisting read stream.

FIG. 11 illustrates a sequence of steps for determining whether a readset 600 is empty and therefore may be matched with a received client request beginning a new read stream. The sequence starts at step 1100 and proceeds to step 1110 where the client read request is received by the file system 260. At step 1120, the file system determines whether the level value 604 stored in the readset 600 is equal to the special indicator value (e.g., −1). If so, then the sequence advances to step 1140 where the file system determines that the readset 600 is empty and may therefore be used to store metadata associated with the new read stream. In this case, the metadata stored in the read set 600 is appropriately updated based on the client read request, such as increasing its count value 606 to equal one. However, if at step 1120 the level value 604 in the readset does not equal the special indicator value, then the received client read request is determined not to be an empty match to the readset 600, at step 1130. In this latter case, the steps 1120-1140 may be repeated for other readsets 600 associated with the client-requested file or directory until an empty match is identified or there are no more readsets to test.

E. Reusing Readsets

In the event that a readset can not be found to match (i.e., exact, fuzzy or empty) a received read request, the file system 260 may be configured to determine whether any of the requested file's readsets can be "reused." More specifically, metadata in a reused readset 600 may be overwritten, thereby reconfiguring the readset to store a new set of metadata associated with the received read request. In accordance with an illustrative embodiment, the level value 604 stored in each readset 600 may be used as an aging mechanism to determine whether the readset is eligible for reuse. Specifically, the level value 604 is incremented whenever a received client request is determined to be an exact or fuzzy match with the readset 600; the level value 604 is set equal to its predetermined initial level value if the received client request is determined to be an empty match with the readset 600. If the client request is not an exact, fuzzy or empty match with the readset, then the file system may select a readset for reuse and decrement the level values 604 in every readset not selected for reuse. A readset reuse policy may be employed to prevent excessive "thrashing" of existing readsets. The reuse policy prevents the readsets' contents from being prematurely overwritten.

Further to the illustrative embodiment, the file system 260 selects a readset 600 to be reused if the readset satisfies either of the following conditions: (i) the readset stores the lowest level value 604 among all the readsets associated with the client-requested file or directory, or (ii) the readset is the most-recently accessed readset associated with the client-requested file or directory and the readset stores a count value 606 equal to one. When the file system identifies a readset 600 that satisfies either of these conditions, the readset is reused, thereby overwriting its contents to store metadata associated with a new read stream beginning with the received client read request. For instance, the reused readset's count value 606 may be overwritten to equal zero, and the readset's level value 604 may be overwritten to equal a predetermined initial value (e.g., equal to 10) between a predetermined upper-bound level value (e.g., equal to 20) and a predetermined lower-bound level value (e.g., equal to zero).

Figure 12A:
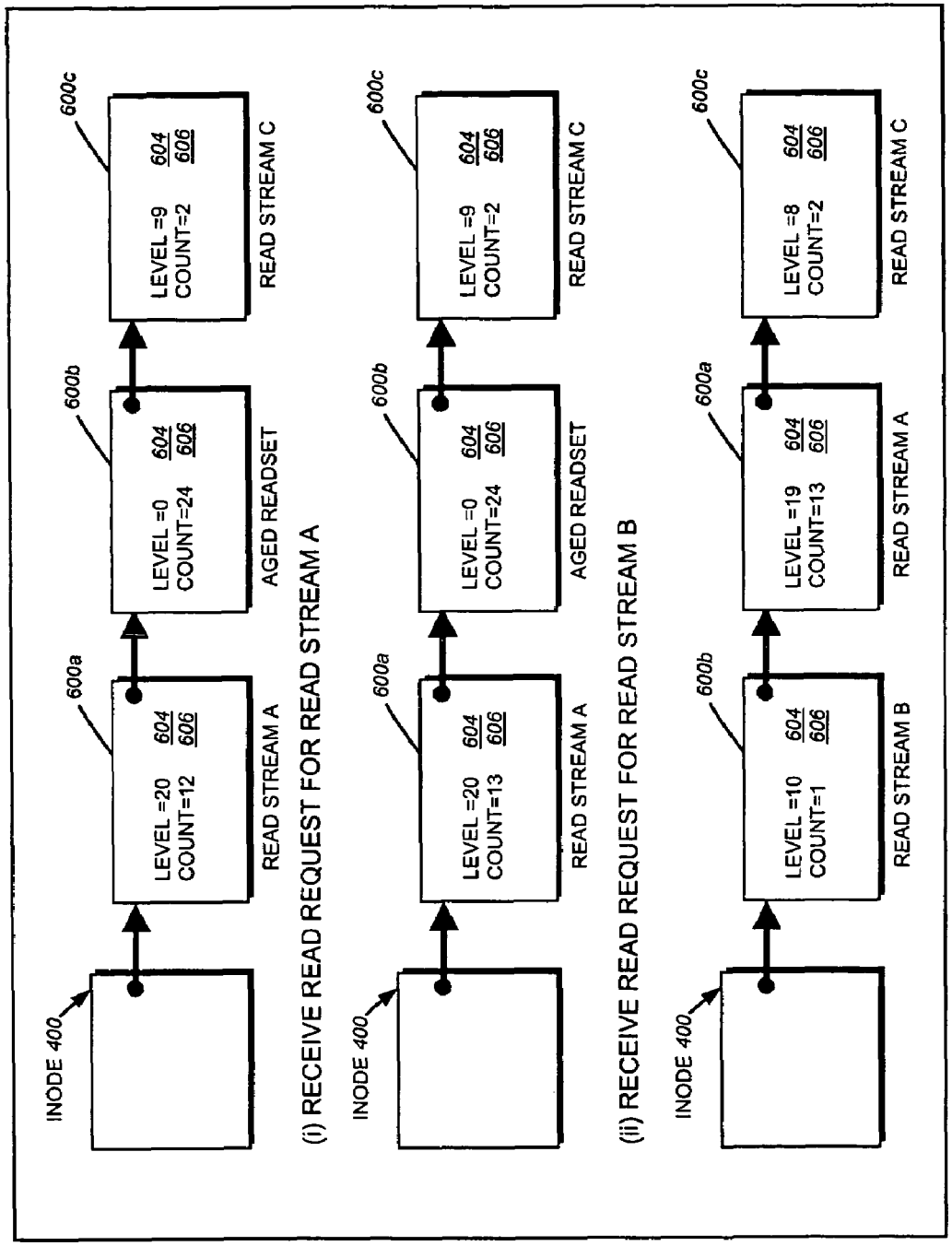
FIGS. 12A-B are schematic block diagrams illustrating an exemplary aging mechanism and reuse policy that may be employed while processing client read requests.
Figure 12B:
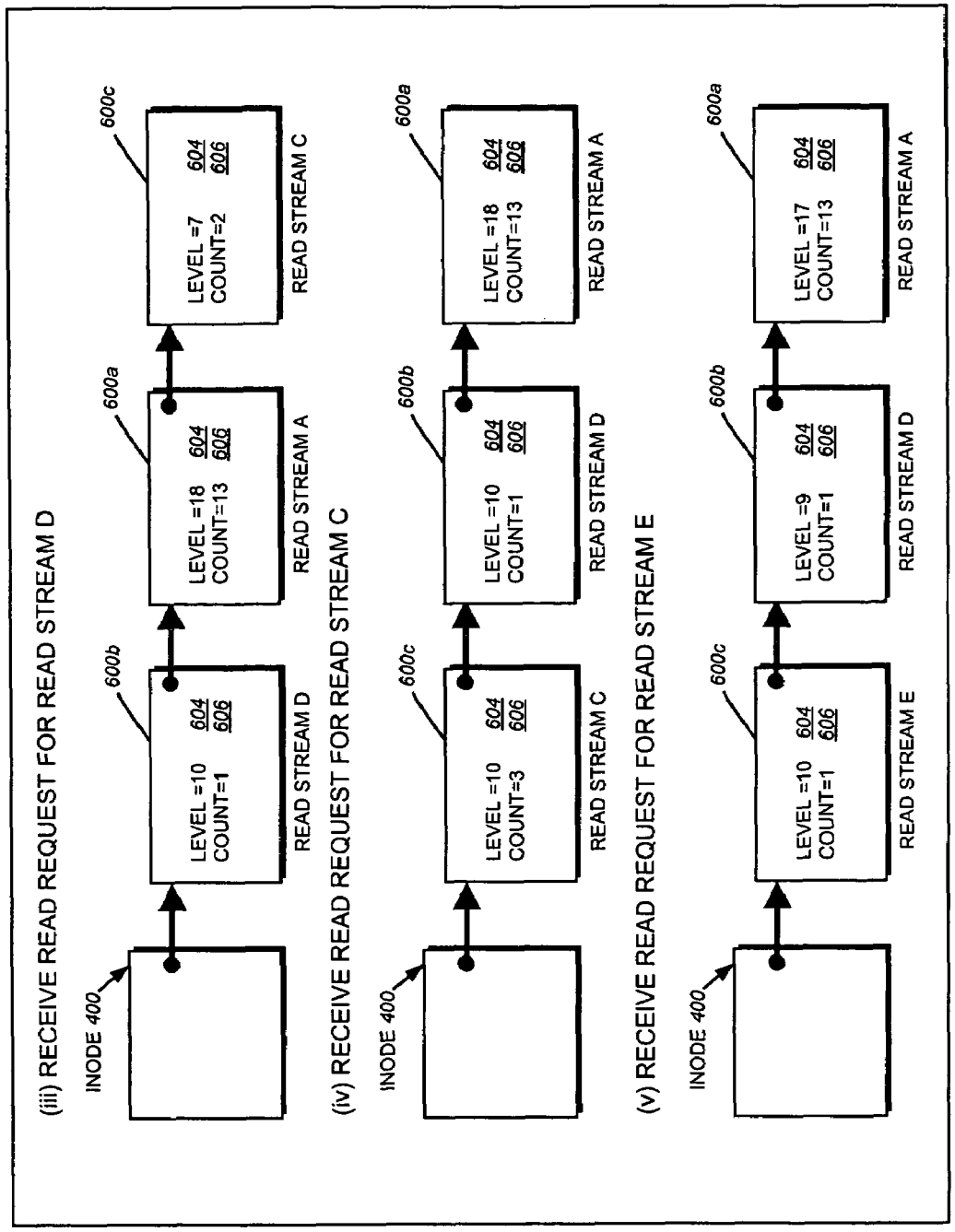

FIGS. 12A-B are schematic block diagrams illustrating the exemplary inode 400 and its three allocated readsets 600a, 600b and 600c. For purposes of illustration, the readsets 600a and 600c initially store metadata, such as a level value 604 and a count value 606, for the read streams A and C, respectively. Further, the readset 600b is initially "aged" since its level value 604 equals zero. Consequently, the metadata stored in the readset 600b corresponds to a read stream that has not received any new client read requests after at least a predetermined number of client requests (e.g., 10 requests) have resulted in the file system 260 reusing the other readsets 600a or 600c. In this illustrative embodiment, the most-recently accessed readset, e.g., the readset 600a, is positioned closest to the inode 400.

At step (i), the file system receives a client read request for data contained in the file or directory associated with the inode 400 and the file system determines that the received request is either an exact or fuzzy match to the readset 600a associated with the read stream A. In response, the file system increments the count value 606 in the readset 600a and also attempts to increment the level value 604 in the readset 600a. However, because the level value 604 in the readset 600a is already equal to its predetermined upper-bound value (e.g., equal to 20), the level value is not further incremented. Because the received client request matched the read stream associated with the readset 600a, the level values 604 and count values 606 in the readsets 600b and 600c remain unchanged. Here, it is noted that the file system in the illustrative embodiment attempts to increment and decrement the level values 604 by one, although it is contemplated that in other embodiments of the invention the level values may be incremented and decremented using other incremental and decremental step sizes.

At step (ii), the file system receives a client read request that is associated with a new read stream B in the file or directory associated with the inode 400. In this case, the received request is not an exact or fuzzy match to any of the readsets 600a-c. Moreover, because none of the illustrated readsets 600a-c stores a level value 604 equal to negative one (i.e., the special indicator value for an empty readset in the illustrative embodiment), the received request is also not an empty match with any of the readsets 600a-c. Since the request does not match any of the readsets 600, the file system 260 employs a readset reuse policy to locate a readset whose contents may be overwritten to store metadata for the newly identified read stream B.

First, the file system determines whether the count value 606 in the most-recently accessed readset 600a equals one. In this case, the count value in the readset 606a does not equal one and instead equals 13. Next, the file system locates which readset 600a-c stores the lowest level value 604, i.e., the level value that is less than or equal to the level values stored in each of the other readsets. The level value 604 stored in readset 600b is the lowest among the readsets 600a-c, and therefore the readset 600b is selected for reuse. Accordingly, the level value 604 in the readset 600b is overwritten to equal the predetermined initial level value (e.g., equal to 10) and its count value 606 is overwritten to equal one. Further, the metadata in the readset 600b is updated to correspond to the new read stream B. The file system decrements the level values 604 stored in the other readsets 600a and 600c and repositions the readset 600b at the head of the linked list of readsets associated with the inode 400, thereby indicating that the readset 600b is now the most-recently accessed readset in the list.

At step (iii), the file system receives a client read request that is associated with a new read stream D in the file or directory associated with the inode 400. Since the received request does not match (exact, fuzzy or empty) any of the readsets 600*a-c*, the file system locates a readset that may be reused to store metadata for the new read stream D. The file system first determines whether the count value 606 in the most-recently accessed readset 600*b* equals one. Because the most-recently accessed readset 600*b* stores a count value equal to one, the file system again selects the readset 600*b* for reuse. Accordingly, the level value 604 in the readset 600*b* is set equal to the predetermined initial level value (e.g., equal to 10) and its count value 606 set equal to one. In this case, the metadata in the readset 600*b* is updated to correspond to the new read stream D. The file system then decrements the level values 604 stored in the other readsets 600*a* and 600*c*. Since the readset 600*b* is already at the head of the linked list of readsets associated with the inode 400, the order of the readsets in the list remains unchanged.

At step (iv), the file system receives a client read request for data contained in the file or directory associated with the inode 400 and the file system determines that the received request is either an exact or fuzzy match to the readset 600*c* associated with the read stream C. Because the level value 604 in the readset 600*c* is less than the predetermined initial level value (e.g., equal to 10), the level value 604 in the readset 600*c* is set equal to the initial level value. In addition, the count value 606 in the readset 600*c* is incremented and the readset 600*c* is repositioned at the head of the readset list to indicate that it is the most-recently accessed readset associated with the inode 400. The level values 604 and count values 606 in the non-matching readsets 600*a* and 600*b* remain unchanged.

Lastly, at step (v), the file system receives a client read request that is associated with a new read stream E in the file or directory associated with the inode 400. Again, the received request does not match (exact, fuzzy or empty) any of the readsets 600*a-c*, so the file system locates a readset that may be reused to store metadata for the new read stream E. The file system first determines whether the count value 606 in the most-recently accessed readset 600*c* equals one. As shown, the count value in the readset 600*c* equals 3, so the file system next determines which of the readsets 600*a-c* stores the lowest level value 604. In this case, the readsets 600*c* and 600*b* both store the lowest level value equal to 10. Illustratively, the file system selects the readset 600*c* for reuse since it is the most-recently accessed readset, although other implementations may use different criteria when two or more readsets each store the lowest level value. Metadata in the readset 600*c* is updated to correspond to the new read stream E. Since the readset 600*c* is already positioned at the head of the list of readsets, the file system does not need to reposition the readset 600*c*. The level value 604 in the readset 600*c* is set equal to the predetermined initial level value and its count value 606 is set equal to one. The level values 604 in the other readsets 600*a* and 600*b* are appropriately decremented.

Figure 13A:
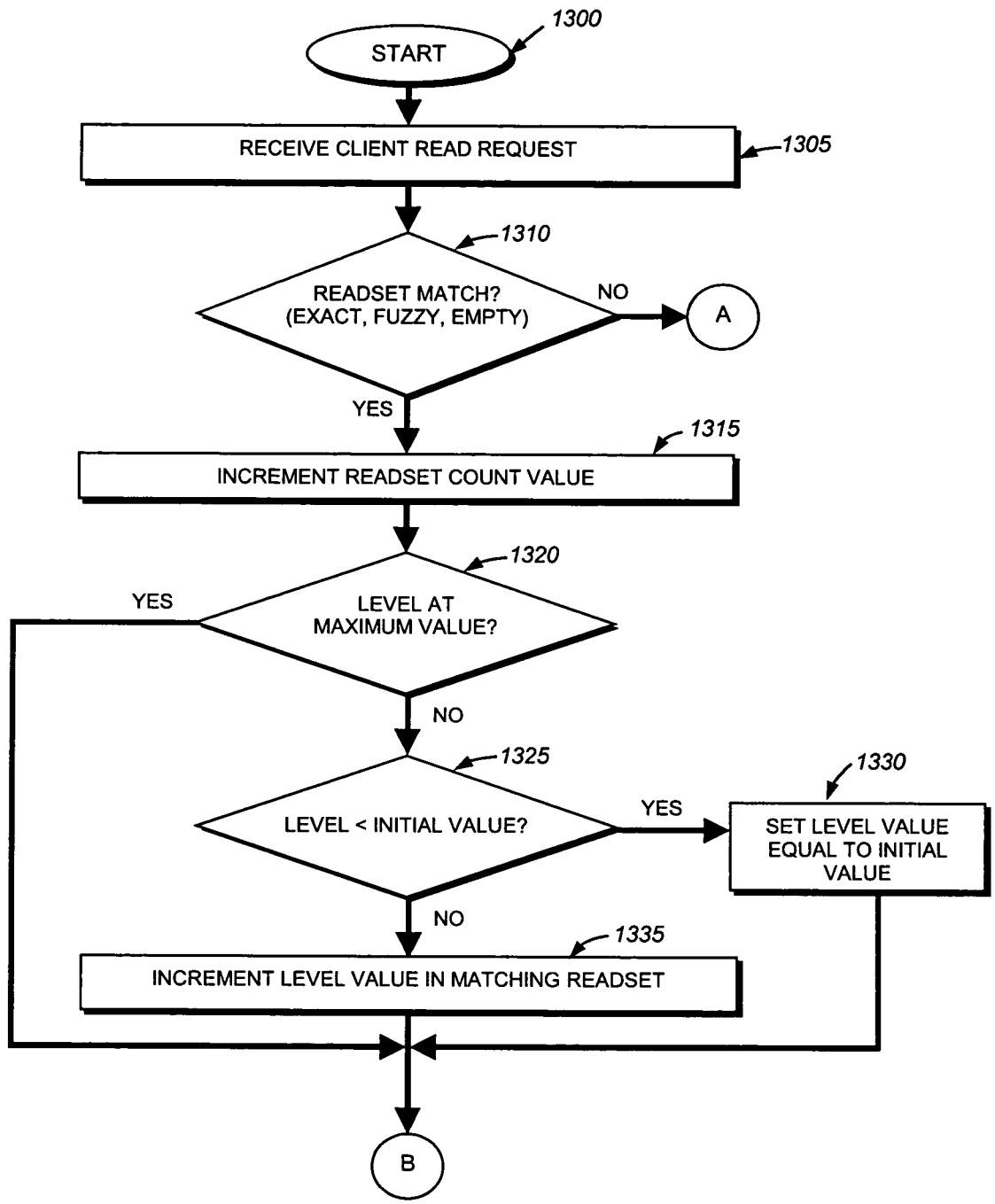
FIGS. 13A-B are flowcharts illustrating a sequence of steps that may be performed for processing a client read request received at the illustrative multiprotocol storage appliance.
Figure 13B:
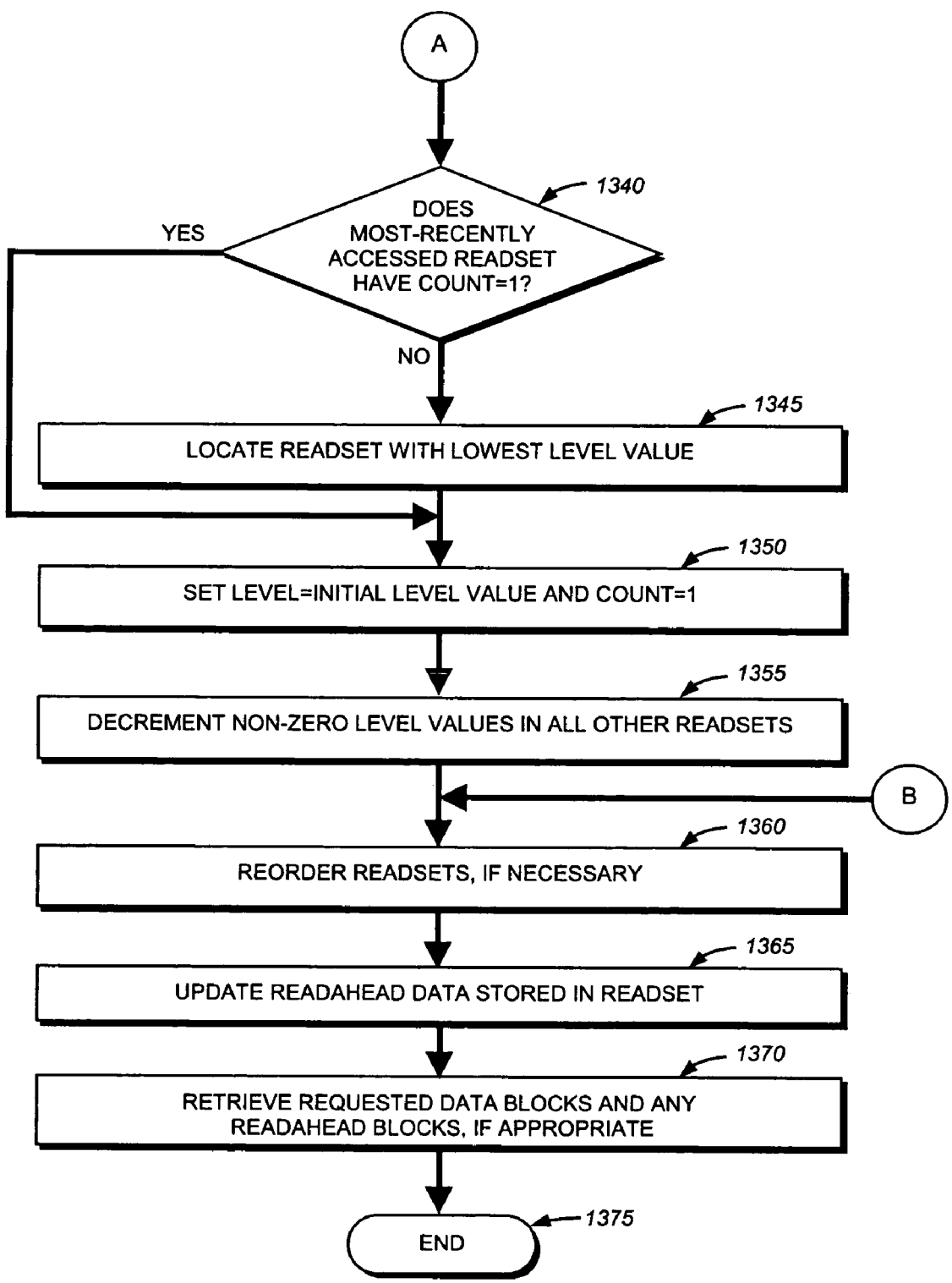

FIGS. 13A-B are flowcharts containing a sequence of steps that may be performed when the file system 260 receives a client read request. Here, it is assumed that the received client read request specifies a set of data to retrieve that is included in a file or directory having at least one associated readset. Notably, if the client-requested data is contained in a file or directory associated with zero readsets, e.g., the file size is too small to support a read stream, then the file system 260 may process the received client read request in a conventional manner, e.g., using traditional readahead techniques.

The sequence starts at step 1300 and proceeds to step 1305 where the file system receives the client read request. Notably, if the received read request is not already formatted in units of data blocks, the file system may reformat the request into units of data blocks, e.g., by specifying a starting data block and a number of successive data blocks to retrieve. In addition, if the received request instructs the file system 260 to retrieve data stored in a newly (i.e., recently) created file or directory, the file system may have to allocate a new inode for the file or directory. Further, the file system also may allocate zero or more readsets for the newly allocated inode, the number of readsets depending on the size of the client-requested file or directory. Illustratively, the new inode may be obtained from the inode pool 152 and its corresponding set of readsets may be acquired from the readset pool 154.

At step 1310, the file system determines whether the received request is an exact, fuzzy or empty match with a readset 600 associated with the client-requested file or directory. If a matching readset is found, the file system 260 increments the count value 606 stored in the matching readset, at step 1315. Then, at step 1320, the file system determines whether the level value 604 stored in the matching readset is equal to a predetermined upper-bound (i.e., maximum) value. If so, the sequence advances to step 1355 and the level value 604 stored in the matching readset is left unchanged. Otherwise, at step 1325, the file system determines whether the level value 604 is less than a predetermined initial level value (e.g., equal to 10). If it is, then the level value is set equal to the predetermined initial value at step 1330 and the sequence progresses to step 1360. If the level value 604 is determined to be greater than or equal to the initial level value at step 1325, then at step 1335 the level value 604 in the matching readset is incremented, e.g., by one. The sequence then advances to step 1360, as described below.

If, at step 1310, the received client read request does not match any of the readsets, the file system 260 locates a readset associated with the client-requested file or directory that can be reused, as set forth in steps 1340-1355. Specifically, at step 1340, the file system determines whether the most-recently accessed readset, e.g., located at the head of a linked list of readsets, stores a count value 606 equal to one. If so, the most-recently accessed readset is selected for reuse. On the other hand, if the count value 606 in the most-recently accessed readset 600 does not equal one, then the readset storing the lowest level value 604 is selected for reuse, at step 1345. In the event that the lowest level value 604 is stored in more than one readset, and one of those readsets is the most-recently accessed readset, then the most-recently accessed readset is selected for reuse. Otherwise, the file system simply selects any one of the plurality of readsets storing the lowest level value.

Next, at step 1350, the level value 604 stored in the readset 600 selected for reuse is set equal to the predetermined initial level value and the readset's count value 606 is set equal to one. At step 1355, the file system decrements all the non-zero level values 604 stored in the readsets that were not selected for reuse or did not match the received client read request. At step 1360, the file system repositions the most-recently accessed readset (i.e., the matching or reused readset) at the head of the list of readsets associated with the client-requested file or directory, if necessary.

At step 1365, the file system updates readahead information, such as the last read offset value 608, the last read size value 610, the next readahead value 612, etc., in the matching or reused readset. At step 1370, the file system 260 retrieves the data blocks 320 containing the client-requested data. The file system may also retrieve one or more readahead data blocks if the received client read request is an exact or fuzzy match to a preexisting read stream and the request extends the preexisting read stream past a predefined file offset or memory address, e.g., specified by a next readahead value 612. The number of readahead data blocks retrieved may be specified by the readahead size 614 stored in the matching readset 600. The file system first may attempt to locate the client-requested and readahead data blocks in one or more in-core memory buffers stored in the memory 150. However, for those data blocks not located in the memory buffers, the file system cooperates with the storage subsystem 250 to retrieve the data blocks from the storage disks 160; the retrieved data blocks may be copied into one or more in-core memory buffers, e.g., acquired from the buffer pool 156. The client's requested data then may be packetized by the storage operating system 200 and returned to the requesting client 190. The sequence ends at step 1375.

F. Conclusion

The foregoing has been a detailed description of an illustrative embodiment of the invention. Various modifications and additions can be made without departing from the spirit and scope of the invention. For example, upon receiving a client read request, the file system 260 may be configured to perform one or more "passes" through a linked list (or other searchable data structure) of readsets associated with the client-requested file or directory to determine whether any of the readsets is an exact, fuzzy or empty match with the received request. For example, the file system may traverse the list in a single pass, thereby sequentially testing each readset in the list until it locates a readset that is an exact, fuzzy or empty match. In this embodiment, the order in which the file system tests a readset to determine if it is an exact, fuzzy or empty match may vary. In an alternate embodiment, separate passes through the list of readsets may be performed to respectively locate exact, fuzzy and empty match readsets.

Although the illustrative list of readsets associated with the inode 400 is arranged with the most-recently accessed readset positioned at the "head" of the list, the file system alternatively may be configured to locate the most-recently accessed readset in other ways as well. For instance, each readset 600 may include a flag 616 that equals a first value when the readset is the most-recently accessed readset in the list and equals a second value otherwise. Also, while the file system 260 ages readsets by appropriately incrementing and decrementing level values 604 after every client read request is processed, it is expressly contemplated that the level values 604 instead may be appropriately aged after predetermined time intervals. In this scenario, the level values 604 may be indicative of the readset's relative age with respect to time rather than with respect to the number of processed client requests.

As noted, files and directories in the illustrative embodiment are broadly defined as any set of data in which zero or more read streams can be established. Accordingly, a file in this context may be embodied as a "virtual disk" (vdisk) that corresponds to a predefined set of data blocks that can be exported to block-based clients 190b as a single logical unit number (lun), even though the data blocks in the virtual disk are accessed using file-based semantics within the multiprotocol storage appliance 100. In this manner, the block-based clients can format their requests in accordance with a conventional block-based protocol, such as the FCP or iSCSI protocol, whereas the requests are processed by a virtualization system implemented by the storage operating system 200 using file-based semantics.

Although the illustrative embodiments depict read streams, e.g., read streams 430 and 435, that extend in a "forward" direction (i.e., in order of increasing data block numbers), those skilled in the art will appreciate that the inventive concepts set forth herein are equally applicable for read streams that extend in a "backward" direction (i.e., in order of decreasing data block numbers). To that end, a flag 616 in each readset may be set equal to a first value to indicate that the readset's associated read stream extends in the forward direction and may equal a second value to indicate that the read stream extends in the backward direction. Accordingly, the file system retrieves readahead data blocks for a read stream in the direction in which the read stream extends, e.g., as specified by the appropriate flag 616.

While this description has been written in reference to a multiprotocol storage appliance 100, the principles are equally pertinent to all types of computers, including those configured for block-based storage systems (such as storage area networks), file-based storage systems (such as network attached storage systems), combinations of both types of storage systems (such as multiprotocol storage appliances), and other forms of computer systems. It is also expressly contemplated that the teachings of this invention can be implemented as software, including a computer-readable medium having program instructions executing on a computer, hardware, firmware, or a combination thereof. Moreover, those skilled in the art will also understand that the teachings set forth herein are not limited to any specific operating system (OS) implementation, and instead may be executed by a wide variety of OS platforms. Accordingly this description is meant to be taken only by way of example and not to otherwise limit the scope of the invention.

What is claimed is:

1. A method for a storage operating system implemented in a storage system to concurrently perform readahead operations for a plurality of different read streams established in one or more files, directories, vdisks or luns stored in the storage system, the method comprising:

allocating at least one readset data structure ("readset") for each of the one or more files, directories, vdisks or luns in which the plurality of different read streams is established, wherein the number of readsets allocated for each file, directory, vdisk or lun depends on the size of that file, directory, vdisk or lun;

receiving a client read request at the storage system, the client read request indicating client-requested data for the storage operating system to retrieve from a file, directory, vdisk or lun stored in the storage system;

determining whether the received client read request matches any of the plurality of readsets allocated for the file, directory, vdisk or lun containing the client-requested data;

performing readahead operations in accordance with a set of readahead metadata stored in an associated readset that is determined to match the received client read request, wherein the readahead metadata describes the associated readset; and if the received client read request does not match any of the readsets allocated for the file, directory, vdisk or lun containing the client-requested data, then performing the steps:

identifying the received client read request as being the first read request in a new read stream;

generating a set of readahead metadata associated with the new read stream;

selecting for reuse one of the readsets allocated for the file, directory, vdisk or lun containing the client-requested data; and storing the generated set of readahead metadata associated with the new read stream in the readset selected for reuse.

2. The method of claim 1, further comprising:
generating a separate set of readahead metadata for each of the plurality of different read streams; and
storing each generated set of readahead metadata in a different readset allocated for the file, directory, vdisk or lun in which the read stream associated with the generated set of readahead metadata is established.

3. The method of claim 1, further comprising:
initializing each allocated readset to store a predetermined set of values.

4. The method of claim 2, wherein the number of readsets allocated for a file, directory, vdisk or lun is dynamically increased as the size of that file, directory, vdisk or lun is increased.

5. The method of claim 1, wherein a first readset is determined to match the received client read request if the first readset stores a set of readahead metadata associated with a read stream that is extended by the client-requested data.

6. The method of claim 1, wherein a second readset is determined to match the received client read request when the client-requested data is located within a predetermined fuzzy range associated with the second readset.

7. The method of claim 6, wherein the fuzzy range is derived based on a multiple of a number of client-requested data blocks specified in the received client read request.

8. The method of claim 6, wherein the fuzzy range extends in both a forward direction and a backward direction in relation to a last data block retrieved in a read stream associated with the second readset.

9. The method of claim 1, wherein a third readset is determined to match the received client read request if the third readset is determined to be unused.

10. The method of claim 9, wherein the third readset is determined to be unused when a level value stored in the third readset equals a special indicator value.

11. The method of claim 1, wherein readahead operations are not performed if the storage operating system determines that the file, directory, vdisk or lun containing the client-requested data is accessed using a random access style.

12. The method of claim 11, wherein a DAFS cache hint included in the received client read request indicates that the file, directory, vdisk or lun containing the client-requested data is accessed using a random access style.

13. The method of claim 1, wherein readahead operations are not performed unless:
(i) a readset is determined to match the received client read request; and
(ii) the matching readset stores a set of readahead metadata associated with a read stream that is extended by the client-requested data past a predetermined data block or memory address.

14. The method of claim 1, wherein the read set selected for reuse stores a level value that is less than or equal to level values stored in each of the other readsets associated with the file, directory, vdisk or lun containing the client-requested data.

15. The method of claim 1, wherein the client read request received at the storage system is a file-based client read request.

16. The method of claim 1, wherein the client read request received at the storage system is a block-based client read request.

17. A storage system that employs a storage operating system to concurrently perform readahead operations for a plurality of different read streams established in one or more files, directories, vdisks or luns stored in the storage system, the storage system comprising:

means for allocating at least one readset data structure ("readset") for each of the one or more files, directories, vdisks or luns in which the plurality of different read streams is established, wherein the number of readsets allocated for each file, directory, vdisk or lun depends on the size of that file, directory, vdisk or lun;

means for receiving a client read request at the storage system, the client read request indicating client-requested data for the storage operating system to retrieve from a file, directory, vdisk or lun stored in the storage system;

means for determining whether the received client read request matches any of the plurality of readsets" allocated for the file, directory, vdisk or lun containing the client-requested data;

means for performing readahead operations in accordance with a set of readahead metadata stored in an associated readset that is determined to match the received client read request, wherein the readahead metadata describes the associated readset; and if the received client read request does not match any of the readsets allocated for the file, directory, vdisk or lun containing the client-requested data, then means for performing:

means for identifying the received client read request as being the first read request in a new read stream;

means for generating a set of readahead metadata associated with the new read stream;

means for selecting for reuse one of the readsets allocated for the file, directory, vdisk or lun containing the client-requested data; and means for storing the generated set of readahead metadata associated with the new read stream in the readset selected for reuse.

18. A computer-readable media comprising instructions for execution in a processor for the practice of a method for a storage operating system implemented in a storage system to concurrently perform readahead operations for a plurality of different read streams established in one or more files, directories, vdisks or luns stored in the storage system, the method comprising:

allocating at least one readset data structure ("readset") for each of the one or more files, directories, vdisks or luns in which the plurality of different read streams is established, wherein the number of readsets allocated for each file, directory, vdisk or lun depends on the size of that file, directory, vdisk or lun;

receiving a client read request at the storage system, the client read request indicating client-requested data for the storage operating system to retrieve from a file, directory, vdisk or lun stored in the storage system;

determining whether the received client read request matches any of the plurality of readsets allocated for the file, directory, vdisk or lun containing the client-requested data;

performing readahead operations in accordance with a set of readahead metadata stored in an associated readset that is determined to match the received client read request, wherein the readahead metadata describes the associated readset; and if the received client read request does not match any of the readsets allocated for the file, directory, vdisk or lun containing the client-requested data, then performing the steps:

identifying the received client read request as being the first read request in a new read stream;

generating a set of readahead metadata associated with the new read stream;

selecting for reuse one of the readsets allocated for the file, directory, vdisk or lun containing the client-requested data; and storing the generated set of readahead metadata associated with the new read stream in the readset selected for reuse.

19. A method for a storage operating system implemented in a storage system to concurrently perform readahead operations for a plurality of different read streams established in one or more files stored in the storage system, comprising:

allocating at least one read ser data structure ("readset") for each of the one or more files, directories, vdisks or luns in which the plurality of different read streams is established wherein the number of readsets allocated for each file depends on the size of that file;

generating a separate set of readahead metadata for each of the plurality of different read streams; and storing each generated set of readahead metadata in a different readset allocated for the file in which the read stream associated with the generated set of readahead metadata is established;

receiving a client read request at the storage system, the client read request indicating client-requested data for the storage operating system to retrieve from a file, stored in the storage system;

determining whether the received client read request matches any of a plurality of readsets allocated for the file containing the client-requested data; and performing readahead operations in accordance with a set of readahead metadata stored in a readset that is determined to match the received client read request; and if the received client read request does not match any of the readsets allocated for the file, directory, vdisk or lun containing the client-requested data, then performing the steps:

identifying the received client read request as being the first read request in a new read stream;

generating a set of readahead metadata associated xvith the new read stream;

selecting for reuse one of the readsets allocated for the file, directory, vdisk or kin containing the client-requested data; and storing the generated set of readahead metadata associated with the new read stream in the readset selected for reuse.

20. The method of claim 19, wherein the file is broad term describing either a file, directory, vdisk or lun.

21. The method of claim 19, further comprising:

initializing each allocated readset to store a predetermined set of values.

22. The method of claim 19, wherein the number of readsets allocated for a file is dynamically increased as the size of that file is increased.

23. The method of claim 19, wherein a first readset is determined to match the received client read request if the first readset stores a set of readahead metadata associated with a read stream that is extended by the client-requested data.

24. The method of claim 19, wherein a second readset is determined to match the received client read request when the client-requested data is located within a predetermined fuzzy range associated with the second readset.

25. The method of claim 24, wherein the fuzzy range is derived based on a multiple of a number of client-requested data blocks specified in the received client read request.

26. The method of claim 24, wherein the fuzzy range extends in both a forward direction and a backward direction in relation to a last data block retrieved in a read stream associated with the second readset.

27. The method of claim 19, wherein a third readset is determined to match the received client read request if the third readset is determined to be unused.

28. The method of claim 27, wherein the third readset is determined to be unused when a level value stored in the third readset equals a special indicator value.

29. The method of claim 19, wherein readahead operations are not performed if the storage operating system determines that the file, directory, vdisk or lun containing the client-requested data is accessed using a random access style.

30. The method of claim 29, wherein a DAPS cache hint included in the received client read request indicates that the file, directory, vdisk or lun containing the client-requested data is accessed using a random access style.

31. The method of claim 19, wherein readahead operations are not performed unless:

(i) a readset is determined to match the received client read request; and (ii) the matching readset stores a set of readahead metadata associated with a read stream that is extended by the client-requested data past a predetermined data block or memory address.

32. The method of claim 19, wherein the readset selected for reuse stores a level value that is less than or equal to level values stored in each of the other readsets associated with the file, directory, vdisk or lun containing the client-requested data.

33. The method of claim 19, wherein the client read request received at the storage system is a file-based client read request.

34. The method of claim 19, wherein the client read request received at the storage system is a block-based client read request.

* * * * *